United States Patent
Renaudeau et al.

(10) Patent No.: US 11,180,975 B2
(45) Date of Patent: Nov. 23, 2021

(54) GEOLOGIC STRUCTURAL MODEL GENERATION

(71) Applicant: Schlumberger Technology Corporation, Sugar Land, TX (US)

(72) Inventors: Julien Renaudeau, Nancy (FR); Frantz Maerten, Pignan (FR); Emmanuel Malvesin, Montpellier (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 522 days.

(21) Appl. No.: 15/993,597

(22) Filed: May 31, 2018

(65) Prior Publication Data
US 2018/0347320 A1 Dec. 6, 2018

Related U.S. Application Data

(60) Provisional application No. 62/513,359, filed on May 31, 2017.

(51) Int. Cl.
*G01V 1/34* (2006.01)
*G01V 1/28* (2006.01)
(Continued)

(52) U.S. Cl.
CPC .......... *E21B 41/0092* (2013.01); *E21B 49/00* (2013.01); *G01V 1/282* (2013.01);
(Continued)

(58) Field of Classification Search
CPC ...... E21B 41/0092; E21B 49/00; G06F 30/20; G06F 2111/10; G01V 99/005;
(Continued)

(56) References Cited

U.S. PATENT DOCUMENTS

2011/0255371 A1\* 10/2011 Jing .................. G01V 1/28
  367/73
2012/0191432 A1\* 7/2012 Khataniar ............ E21B 43/00
  703/10
(Continued)

FOREIGN PATENT DOCUMENTS

WO 2016/001697 A1 1/2016
WO 2017/016895 A1 2/2017

OTHER PUBLICATIONS

Laurent, Gautier. "Iterative thickness regularization of stratigraphic layers in discrete implicit modeling." Mathematical Geosciences 48.7 (2016): 811-833.\*
(Continued)

*Primary Examiner* — Saif A Alhija

(57) ABSTRACT

A method can include receiving spatially located geophysical data of a geologic region as acquired by one or more sensors; solving a system of equations for multi-dimensional implicit function values within a multi-dimensional space that represents the geologic region where the system of equations are subject to a smoothness constraint and subject to a weighted curvature minimization criterion at a plurality of spatially located points based on the spatially located geophysical data; and rendering to a display, a structural model of the geologic region based at least in part on the multi-dimensional implicit function values where the structural model characterizes stratigraphy of the geologic region.

19 Claims, 16 Drawing Sheets

(51) Int. Cl.
  *G01V 99/00*    (2009.01)
  *G06F 30/20*    (2020.01)
  *G06F 111/10*   (2020.01)
  *E21B 41/00*    (2006.01)
  *E21B 49/00*    (2006.01)

(52) U.S. Cl.
  CPC ............ *G01V 1/345* (2013.01); *G01V 99/005* (2013.01); *G06F 30/20* (2020.01); *G01V 2210/62* (2013.01); *G01V 2210/643* (2013.01); *G01V 2210/663* (2013.01); *G06F 2111/10* (2020.01)

(58) Field of Classification Search
  CPC .. G01V 1/345; G01V 1/282; G01V 2210/663; G01V 2210/643; G01V 2210/62
  See application file for complete search history.

(56) References Cited

U.S. PATENT DOCUMENTS

2013/0262052 A1  10/2013  Mallet et al.
2014/0222403 A1  8/2014   Lepage et al.

OTHER PUBLICATIONS

Calcagno, et al., "Geological modelling from field data and geological knowledge, Part I. Modelling method coupling 3D potential-field interpolation and geological rules," Physics of the Earth and Planetary Interiors, 2008, 171(1-4), pp. 147-157.

Caumon, et al., "Surface-based 3d modeling of geological structures," Mathematical Geosciences, 2009, 41(8), pp. 927-945.

Chen, "The method of fundamental solutions for non-linear thermal explosions," Communications in Numerical Methods in Engineering, 1995, 11(8), pp. 675-681.

Chiles, et al., "Modelling the Geometry of Geological Units and its Uncertainty in 3D From Structural Data: The Potential-Field Method," Orebody Modeling and Strategic Mine Planning—Spectrum 14, Jul. 2004, pp. 22-24.

Frank, et al., "3D-reconstruction of complex geological interfaces from irregularly distributed and noisy point data," Computers & Geosciences, 2007, 33(7), pp. 932-943.

Hillier, et al., "Three-Dimensional Modelling of Geological Surfaces Using Generalized Interpolation with Radial Basis Functions," Mathematical Geosciences, 2014, 46(8), pp. 931-953.

Mallet, "Discrete smooth interpolation in geometric modelling," Computer-aided Design, 1992, 24(4), pp. 178-191.

Mallet, "Geomodeling, Chapter 4: Discrete Smooth Interpolation," Oxford University Press, Inc., 2002.

Souche, et al. "Construction of structurally and stratigraphically consistent structural models using the volume-based modelling technology: Applications to an Australian dataset," International Petroleum Technology Conference, Kuala Lumpur, Malaysia, Dec. 10-12, 2014, 2014.

Wahba, "Spline models for observational data, Chapter 3: Equivalence and Perpendicularity," Society for Industrial and Applied Mathematics, Philadelphia, Pennsylvania, 1990, vol. 59.

Laurent, "Iterative thickness regularization of stratigraphic layers in discrete implicit modeling," Mathematical Geosciences, vol. 48, Jun. 14, 2016, pp. 811-833.

Extended Search Report for the equivalent European patent application 18175361.7 dated Nov. 13, 2018.

* cited by examiner

Method 500

Method 550

600

System 1400

GEOLOGIC STRUCTURAL MODEL GENERATION

RELATED APPLICATION

This application claims priority to and the benefit of a US Provisional application having Ser. No. 62/513,359, filed 31 May 2017, which is incorporated by reference herein.

BACKGROUND

Phenomena associated with a sedimentary basin may be modeled using a mesh, a grid, etc. As an example, a structural model may be created based on data associated with a sedimentary basin. For example, where a basin includes various types of features (e.g., stratigraphic layers, faults, etc.), data associated with such features may be used to create a structural model of the basin. Such a model may be a basis for analysis, further modeling, etc. Various technologies, techniques, etc., described herein pertain to structural modeling, structural models, etc.

SUMMARY

A method can include receiving spatially located geophysical data of a geologic region as acquired by one or more sensors; solving a system of equations for multi-dimensional implicit function values within a multi-dimensional space that represents the geologic region where the system of equations are subject to a smoothness constraint and subject to a weighted curvature minimization criterion at a plurality of spatially located points based on the spatially located geophysical data; and rendering to a display, a structural model of the geologic region based at least in part on the multi-dimensional implicit function values where the structural model characterizes stratigraphy of the geologic region. A system can include a processor; memory operatively coupled to the processor; processor-executable instructions stored in the memory to instruct the system to: receive spatially located geophysical data of a geologic region as acquired by one or more sensors; solve a system of equations for multi-dimensional implicit function values within a multi-dimensional space that represents the geologic region where the system of equations are subject to a smoothness constraint and subject to a weighted curvature minimization criterion at a plurality of spatially located points based on the spatially located geophysical data; and render to a display, a structural model of the geologic region based at least in part on the multi-dimensional implicit function values where the structural model characterizes stratigraphy of the geologic region. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
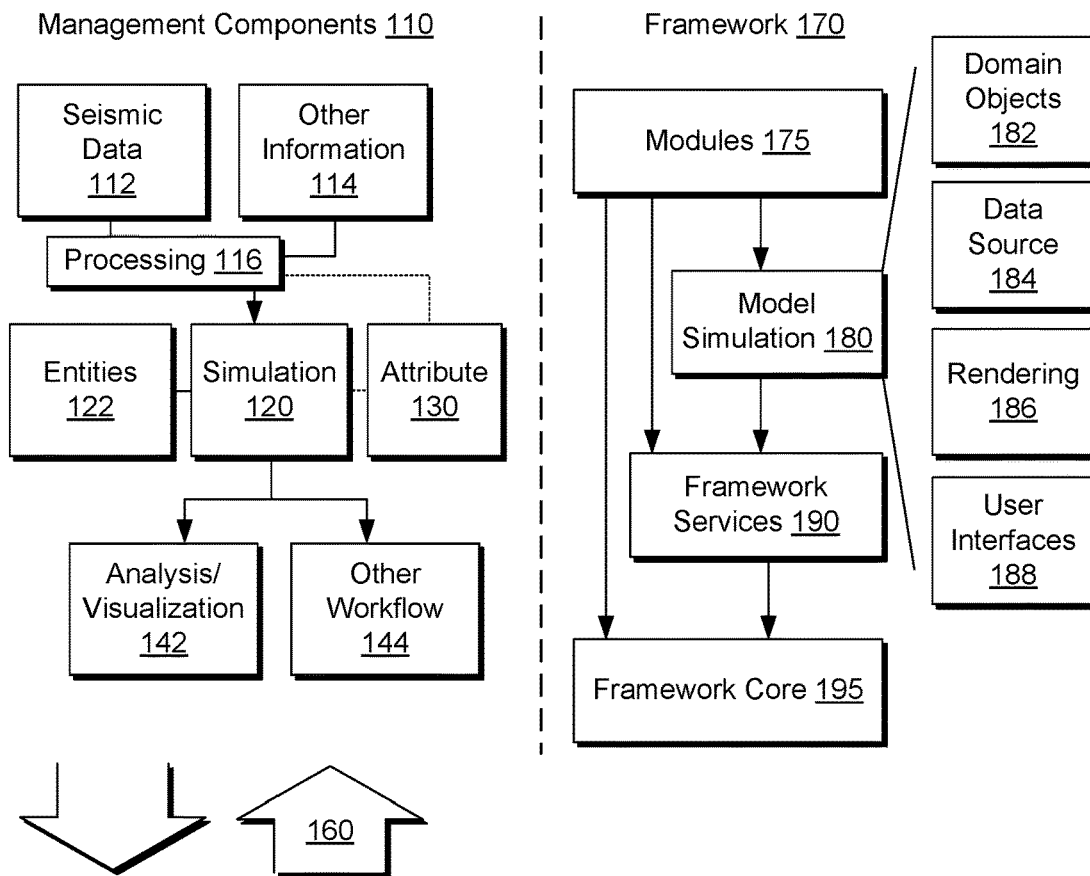
FIG. 1 illustrates an example system that includes various components for simulating a geological environment.
Figure 1:
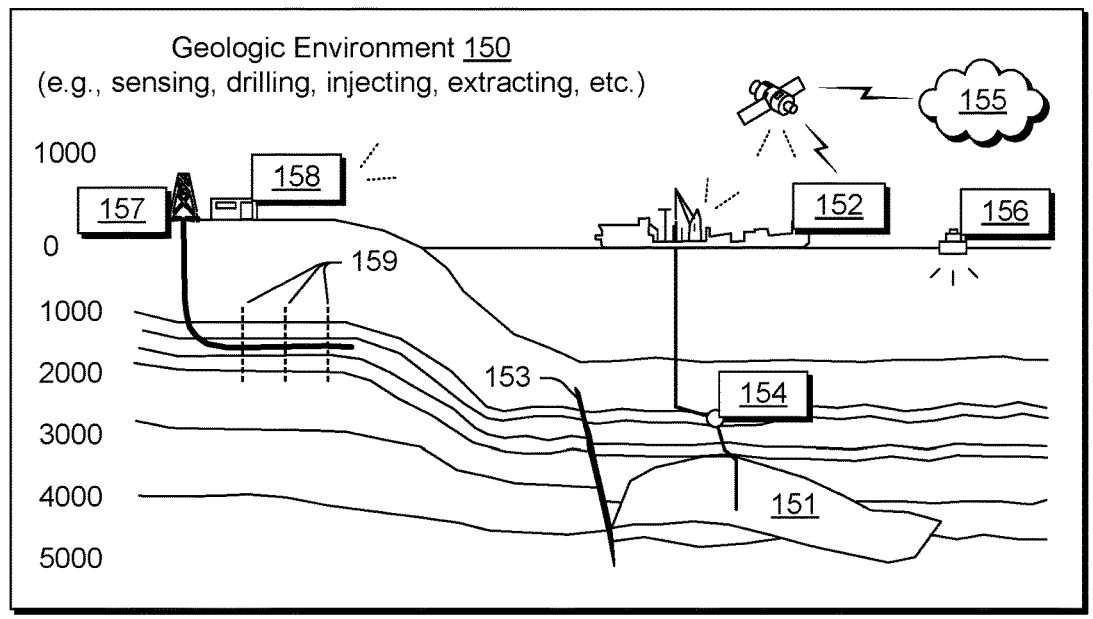

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Phenomena associated with a sedimentary basin (e.g., a subsurface region, whether below a ground surface, water surface, etc.) may be modeled using a model or models. As an example, a structural model of a basin may find use for understanding various processes related to exploration and production of natural resources (estimating reserves in place, drilling wells, forecasting production, etc.). As an example, a structural model may be used as a basis for building a model for use with a numerical technique.

For application of a numerical technique, equations may be discretized using a grid that includes nodes, cells, etc. To represent features in a geologic environment, a structural model may assist with properly locating nodes, cells, etc. of a grid for use in simulation using one or more numerical techniques. As an example, a structural model may itself include a mesh, which may, at times be referred to as a grid. As an example, a structural model may provide for analysis optionally without resorting to creation of a grid suited for discretization of equations for a numerical solver (e.g., consider a structured grid that may reduce computational demands, etc.).

As to numerical techniques, a numerical technique such as the finite difference method can include discretizing a 1D differential heat equation for temperature with respect to a spatial coordinate to approximate temperature derivatives (e.g., first order, second order, etc.). Where time is of interest, a derivative of temperature with respect to time may also be provided. As to the spatial coordinate, the numerical technique may rely on a spatial grid that includes various nodes where a temperature will be provided for each node upon solving the heat equation (e.g., subject to boundary conditions, generation terms, etc.). Such an example may apply to multiple dimensions in space (e.g., where discretization is applied to the multiple dimensions). Thus, a grid may discretize a volume of interest (VOI) into elementary elements (e.g., cells or grid blocks) that may be assigned or associated with properties (e.g. porosity, rock type, etc.), which may be germane to simulation of physical processes (e.g., fluid flow, reservoir compaction, etc.).

As another example of a numerical technique, consider the finite element method where space may be represented by one dimensional or multi-dimensional "elements". For one spatial dimension, an element may be represented by two nodes positioned along a spatial coordinate. For multiple spatial dimensions, an element may include any number of nodes. Further, some equations may be represented by certain nodes while others are represented by fewer nodes (e.g., consider an example for the Navier-Stokes equations where fewer nodes represent pressure). The finite element method may include providing nodes that can define triangular elements (e.g., tetrahedra in 3D, higher order simplexes in multidimensional spaces, etc.) or quadrilateral elements (e.g., hexahedra or pyramids in 3D, etc.), or polygonal elements (e.g., prisms in 3D, etc.). Such elements, as defined by corresponding nodes of a grid, may be referred to as grid cells.

Yet another example of a numerical technique is the finite volume method. For the finite volume method, values for model equation variables may be calculated at discrete places on a grid, for example, a node of the grid that includes a "finite volume" surrounding it. The finite volume method may apply the divergence theorem for evaluation of fluxes at surfaces of each finite volume such that flux entering a given finite volume equals that leaving to one or more adjacent finite volumes (e.g., to adhere to conservation laws). For the finite volume method, nodes of a grid may define grid cells.

As mentioned, where a sedimentary basin (e.g., subsurface region) includes various types of features (e.g., stratigraphic layers, faults, etc.) where nodes, cells, etc. of a mesh or grid may represent, or be assigned to, such features. As an example, consider a structural model that may include one or more meshes. Such a model may serve as a basis for formation of a grid for discretized equations to represent a sedimentary basin and its features.

As to a stratigraphic sequence, a sedimentary basin may include sedimentary deposits grouped into stratigraphic units, for example, based on any of a variety of factors, to approximate or represent time lines that place stratigraphy in a chronostratigraphic framework. While sequence stratigraphy is mentioned, lithostratigraphy may be applied, for example, based on similarity of lithology of rock units (e.g., rather than time-related factors).

As an example, a mesh may conform to structural features such as, for example, Y-faults, X-faults, low-angle unconformities, salt bodies, intrusions, etc. (e.g., geological discontinuities), to more fully capture complexity of a geological model. As an example, a mesh may optionally conform to stratigraphy (e.g., in addition to one or more geological discontinuities). As to geological discontinuities, these may include model discontinuities such as one or more model boundaries. As an example, a mesh may be populated with property fields generated, for example, by geostatistical methods.

In general, a relationship may exist between node spacing and phenomenon or phenomena being modeled. Various scales may exist within a geologic environment, for example, a molecular scale may be on the order of approximately $10^{-9}$ to approximately $10^{-8}$ meters, a pore scale may be on the order of approximately $10^{-6}$ to approximately $10^{-3}$ meters, bulk continuum may be on the order of approximately $10^{-3}$ to approximately $10^{-2}$ meters, and a basin scale on the order of approximately $10^3$ to approximately $10^5$ meters. As an example, nodes of a mesh may be selected based at least in part on the type of phenomenon or phenomena being modeled (e.g., to select nodes of appropriate spacing or spacings). As an example, nodes of a grid may include node-to-node spacing of about 10 meters to about 500 meters. In such an example, a basin being modeled may span, for example, over approximately $10^3$ meters. As an example, node-to-node space may vary, for example, being smaller or larger than the aforementioned spacings.

Some data may be involved in building an initial mesh and, thereafter, a model, a corresponding mesh, etc. may optionally be updated in response to model output, changes in time, physical phenomena, additional data, etc. Data may include one or more of the following: depth or thickness maps and fault geometries and timing from seismic, remote-sensing, electromagnetic, gravity, outcrop and well log data. Furthermore, data may include depth and thickness maps stemming from facies variations.

FIG. 1 shows an example of a system 100 that includes various management components 110 to manage various aspects of a geologic environment 150 (e.g., an environment that includes a sedimentary basin, a reservoir 151, one or more fractures 153, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. An example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a reservoir or reservoirs may be simulated with respect to one or more enhanced recovery techniques (e.g., consider a thermal process such as SAGD, etc.).

In an example embodiment, the management components 110 may include features of a framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a framework environment such as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the OCEAN® framework where the model simulation layer 180 is the PETREL® model-centric software package that hosts OCEAN® framework applications. In an example embodiment, the PETREL® software may be considered a data-driven application. The PETREL® software can include a framework for model building and visualization. Such a model may include one or more grids.

The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

In the example of FIG. 1, the domain objects 182 can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and that may be intersected by a fault 153. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

As an example, a method may include structural modeling, for example, building a structural model, editing a structural model, etc. of a geologic environment. As an example, a workflow may include providing a structural model prior to construction of a grid (e.g., using the structural model), which may, in turn, be suitable for use with one or more numerical techniques. As an example, one or more applications may operate on a structural model (e.g., input of a structural model).

Figure 2:
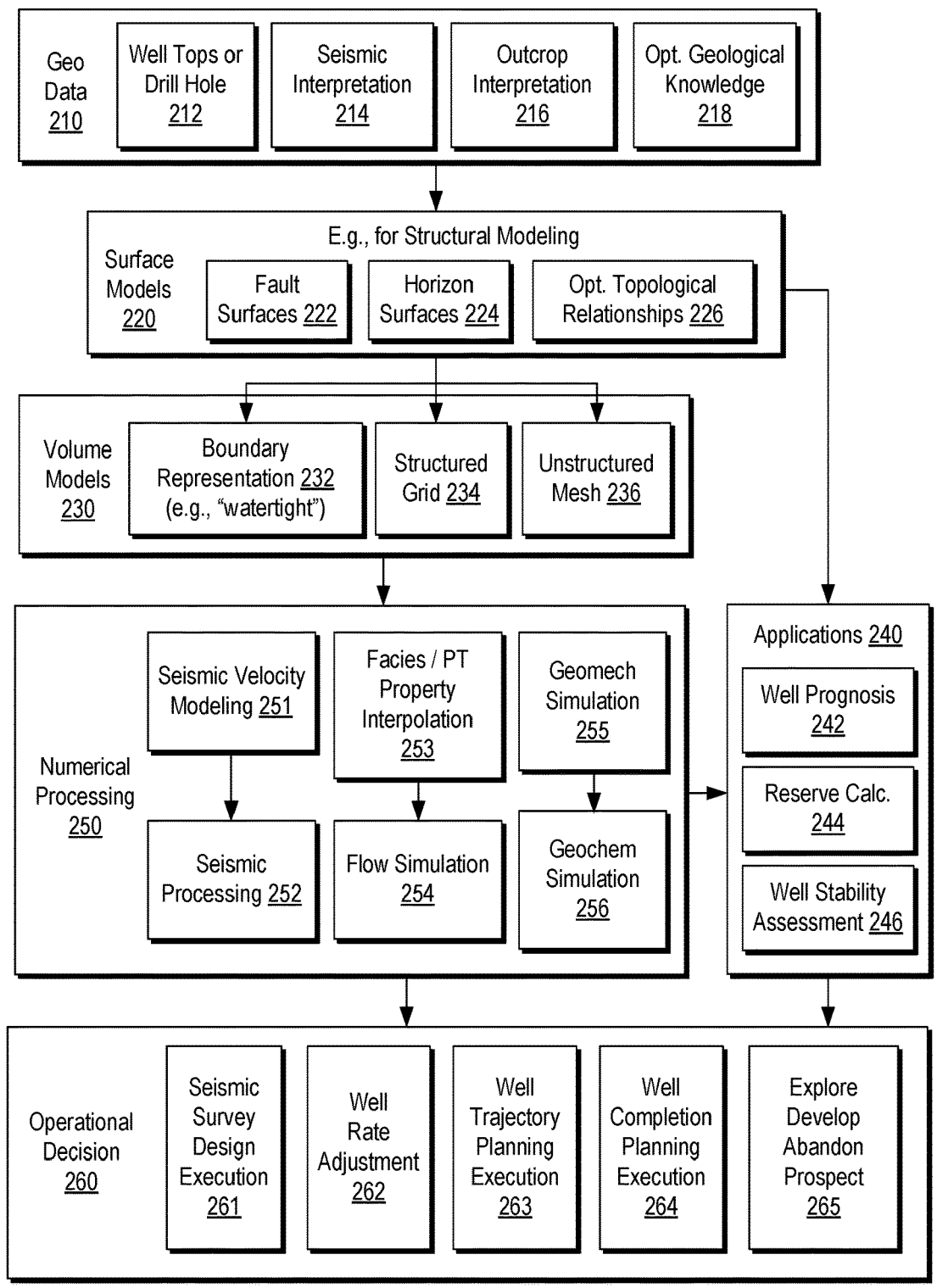
FIG. 2 illustrates an example of a system.

FIG. 2 shows an example of a system 200 that includes a geological/geophysical data block 210, a surface models block 220 (e.g., for one or more structural models), a volume modules block 230, an applications block 240, a numerical processing block 250 and an operational decision block 260. As shown in the example of FIG. 2, the geological/geophysical data block 210 can include data from well tops or drill holes 212, data from seismic interpretation 214, data from outcrop interpretation and optionally data from geological knowledge. As to the surface models block 220, it may provide for creation, editing, etc. of one or more surface models based on, for example, one or more of fault surfaces 222, horizon surfaces 224 and optionally topological relationships 226. As to the volume models block 230, it may provide for creation, editing, etc. of one or more volume models based on, for example, one or more of boundary representations 232 (e.g., to form a watertight model), structured grids 234 and unstructured meshes 236.

As shown in the example of FIG. 2, the system 200 may allow for implementing one or more workflows, for example, where data of the data block 210 are used to create, edit, etc. one or more surface models of the surface models block 220, which may be used to create, edit, etc. one or more volume models of the volume models block 230. As indicated in the example of FIG. 2, the surface models block 220 may provide one or more structural models, which may be input to the applications block 240. For example, such a structural model may be provided to one or more applications, optionally without performing one or more processes of the volume models block 230 (e.g., for purposes of numerical processing by the numerical processing block 250). Accordingly, the system 200 may be suitable for one or more workflows for structural modeling (e.g., optionally without performing numerical processing per the numerical processing block 250).

As to the applications block 240, it may include applications such as a well prognosis application 242, a reserve calculation application 244 and a well stability assessment application 246. As to the numerical processing block 250, it may include a process for seismic velocity modeling 251 followed by seismic processing 252, a process for facies and petrotechnical property interpolation 253 followed by flow simulation 254, and a process for geomechanical simulation 255 followed by geochemical simulation 256. As indicated, as an example, a workflow may proceed from the volume models block 230 to the numerical processing block 250 and then to the applications block 240 and/or to the operational decision block 260. As another example, a workflow may proceed from the surface models block 220 to the applications block 240 and then to the operational decisions block 260 (e.g., consider an application that operates using a structural model).

In the example of FIG. 2, the operational decisions block 260 may include a seismic survey design process 261, a well rate adjustment process 252, a well trajectory planning process 263, a well completion planning process 264 and a process for one or more prospects, for example, to decide whether to explore, develop, abandon, etc. a prospect.

Referring again to the data block 210, the well tops or drill hole data 212 may include spatial localization, and optionally surface dip, of an interface between two geological formations or of a subsurface discontinuity such as a geological fault; the seismic interpretation data 214 may include a set of points, lines or surface patches interpreted from seismic reflection data, and representing interfaces between media (e.g., geological formations in which seismic wave velocity differs) or subsurface discontinuities; the outcrop interpretation data 216 may include a set of lines or points, optionally associated with measured dip, representing boundaries between geological formations or geological faults, as interpreted on the earth surface; and the geological knowledge data 218 may include, for example knowledge of the paleo-tectonic and sedimentary evolution of a region.

As to a structural model, it may be, for example, a set of gridded or meshed surfaces representing one or more interfaces between geological formations (e.g., horizon surfaces, unconformal surfaces, geobodies, etc.) or mechanical discontinuities (fault surfaces) in the subsurface. As an example, a structural model may include some information about one or more topological relationships between surfaces (e.g. fault A truncates fault B, fault B intersects fault C, etc.).

As an example, an environment may include one or more conformal surfaces and/or one or more unconformal surfaces. As an example, an unconformity may be a geological surface that is disposed between older material from younger material (e.g., older rock and younger rock) and that represents a gap in a geologic record. As an example, such a surface might result from a hiatus in deposition of sediments, possibly in combination with erosion, or deformation such as faulting. An angular unconformity may be a type of unconformity that separates younger strata from eroded, dipping older strata. As an example, a disconformity may represent a time of nondeposition, possibly combined with erosion. As an example, a nonconformity may separate overlying strata from eroded, older igneous or metamorphic rocks. As an example, a workflow may include analysis and interpretation of one or more unconformities (e.g., locally, regionally and/or globally) and may include analysis and interpretation of sequence stratigraphy based at least in part thereon.

As an example, a conformable surface may be a conformable horizon surface, for example, a horizon surface between a lower horizon and an upper horizon where the horizons have undergone a relatively common geologic history, for example, being deposited in succession (e.g., continuous in time). As an example, in an environment, horizons may not intersect one another and each of the horizons may be considered conformable to adjacent horizons (e.g., lower and upper or older and younger).

As an example, erosion may act to denude rock, for example, as a result of physical, chemical and/or biological breakdown and/or transportation. Erosion may occur, for example, as material (e.g., weathered from rock, etc.) is transported by fluids, solids (e.g., wind, water or ice) or mass-wasting (e.g., as in rock falls and landslides). As an example, consider two sequences where a lower sequence may have been eroded and an upper sequence deposited on top of the eroded lower sequence. In such an example, the boundary between the two sequences may be referred to as an erosion; noting that it is conformable to the upper, younger sequence. As an example, erosion may act to "truncate" a sequence of horizons and to form surface upon which subsequent material may be deposited (e.g., optionally in a conformable manner).

As an example, a baselap may be a type of feature in an environment, for example, such as a downlap or an onlap. As an example, a downlap may be a termination of more steeply dipping overlying strata against a surface or underlying strata that have lower apparent dips. For example, a downlap may be seen at the base of prograding clinoforms and may represent progradation of a basin margin. As to an onlap, for example, it may be a termination of shallowly dipping, younger strata against more steeply dipping, older strata (e.g., sequence stratigraphy that may occur during periods of transgression). As an example, a type of baselap may be considered to be a downlap (e.g., lower strata having lower apparent dips). In such an example, the baselap boundary tends to be conformable to immediately older horizons (lower sequence).

As an example, given three sequences, a discontinuity may exist as a boundary that is neither conformable to older horizons nor to younger ones. As an example, erosions, baselaps and discontinuities may be referred to as unconformities or non-conformable horizons (e.g., or surfaces, layers, etc.).

As an example, one or more intrusions may exist in an environment. For example, an intrusion may be a structure or structures formed via a process known as sediment injection. For example, consider sills emplaced parallel to bedding or dikes that cut through bedding. Strata that include an intrusion may be referred to as host strata and the layer or layers that feed an intrusion may be referred to as a parent bed or beds. As an example, a sand-injection feature may exhibit a size scale, which may be, for example, of an order within a range of an order of millimeters to an order of kilometers. Evidence of a feature may exist in a core, a borehole image log, a seismic section, an outcrop, an aerial photograph, a satellite image, etc. (e.g., depending on size scale).

As to the one or more boundary representations 232, they may include a numerical representation in which a subsurface model is partitioned into various closed units representing geological layers and fault blocks where an individual unit may be defined by its boundary and, optionally, by a set of internal boundaries such as fault surfaces.

As to the one or more structured grids 234, it may include a grid that partitions a volume of interest into different elementary volumes (cells), for example, that may be indexed according to a pre-defined, repeating pattern. As to the one or more unstructured meshes 236, it may include a mesh that partitions a volume of interest into different elementary volumes, for example, that may not be readily indexed following a pre-defined, repeating pattern (e.g., consider a Cartesian cube with indexes I, J, and K, along x, y, and z axes).

As to the seismic velocity modeling 251, it may include calculation of velocity of propagation of seismic waves (e.g., where seismic velocity depends on type of seismic wave and on direction of propagation of the wave). As to the seismic processing 252, it may include a set of processes allowing identification of localization of seismic reflectors in space, physical characteristics of the rocks in between these reflectors, etc.

As to the facies and petrophysical property interpolation 253, it may include an assessment of type of rocks and of their petrophysical properties (e.g. porosity, permeability), for example, optionally in areas not sampled by well logs or coring. As an example, such an interpolation may be constrained by interpretations from log and core data, and by prior geological knowledge.

As to the flow simulation 254, as an example, it may include simulation of flow of hydro-carbons in the subsurface, for example, through geological times (e.g., in the context of petroleum systems modeling, when trying to predict the presence and quality of oil in an un-drilled formation) or during the exploitation of a hydrocarbon reservoir (e.g., when some fluids are pumped from or into the reservoir).

As to geomechanical simulation 255, it may include simulation of the deformation of rocks under boundary conditions. Such a simulation may be used, for example, to assess compaction of a reservoir (e.g., associated with its depletion, when hydrocarbons are pumped from the porous and deformable rock that composes the reservoir). As an example a geomechanical simulation may be used for a variety of purposes such as, for example, prediction of fracturing, reconstruction of the paleo-geometries of the reservoir as they were prior to tectonic deformations, etc.

As to geochemical simulation 256, such a simulation may simulate evolution of hydrocarbon formation and composition through geological history (e.g., to assess the likelihood of oil accumulation in a particular subterranean formation while exploring new prospects).

As to the various applications of the applications block 240, the well prognosis application 242 may include predicting type and characteristics of geological formations that may be encountered by a drill-bit, and location where such rocks may be encountered (e.g., before a well is drilled); the reserve calculations application 244 may include assessing total amount of hydrocarbons or ore material present in a subsurface environment (e.g., and estimates of which proportion can be recovered, given a set of economic and technical constraints); and the well stability assessment application 246 may include estimating risk that a well, already drilled or to-be-drilled, will collapse or be damaged due underground stress.

As to the operational decision block 260, the seismic survey design process 261 may include deciding where to place seismic sources and receivers to optimize the coverage and quality of the collected seismic information while minimizing cost of acquisition; the well rate adjustment process 262 may include controlling injection and production well schedules and rates (e.g., to maximize recovery and production); the well trajectory planning process 263 may include designing a well trajectory to maximize potential recovery and production while minimizing drilling risks and costs; the well trajectory planning process 264 may include selecting proper well tubing, casing and completion (e.g., to meet expected production or injection targets in specified reservoir formations); and the prospect process 265 may include decision making, in an exploration context, to continue exploring, start producing or abandon prospects (e.g., based on an integrated assessment of technical and financial risks against expected benefits). As indicated, the operational decision block 260 can include execution, which can include control of one or more processes (e.g., surveying, rate adjustment, drilling a trajectory, completing a well, etc.).

As an example, a method may include implicit modeling that includes using one or more implicit functions. As an example, such a method can include representing geological horizons in three-dimensions using specific iso-surfaces of a scalar property field (e.g., an implicit function) defined on a three-dimensional background mesh. As an example, a method can include representing one or more types of features additionally or alternatively to geological horizons. For example, consider a method that includes representing one or more unconformities or other types of features.

As an example, a method that includes implicit modeling may assist with exploration and production of natural resources such as, for example, hydrocarbons or minerals. As an example, such a method may include modeling one or more faulted structures that may include geological layers that vary spatially in thickness. As an example, such a method may be employed to model large (basin) scale areas, syn-tectonic deposition, etc.

Figure 3:
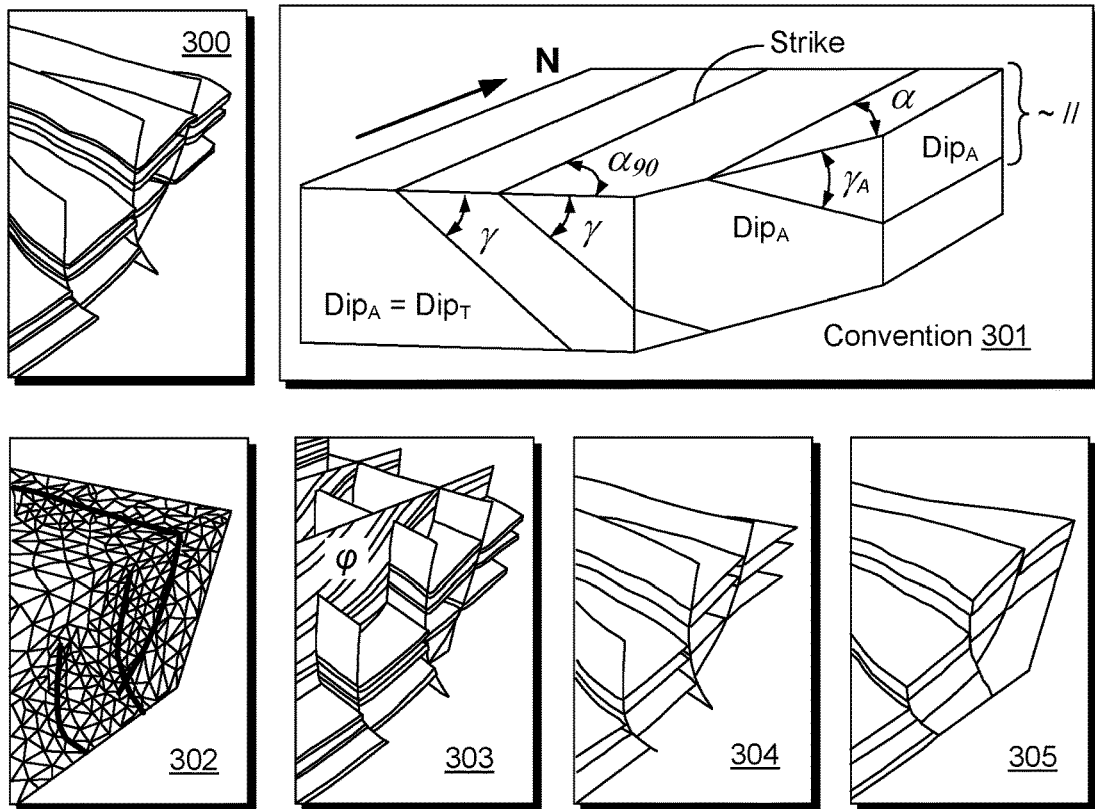
FIG. 3 illustrates examples of a method, a convention, constraints and equations.

FIG. 3 shows an example of a plot of a geologic environment 300 that may be represented in part by a convention 301. As an example, a method may employ implicit modeling to analyze the geologic environment, for example, as shown in the plots 302, 303, 304 and 305. FIG. 3 also shows an example of a control point constraints formulation 310 and an example of a linear system of equations formulation 330, which pertain to an implicit function ($\varphi$).

In FIG. 3, the plot of the geologic environment 300 may be based at least in part on input data, for example, related to one or more fault surfaces, horizon points, etc. As an example, one or more features in such a geologic environment may be characterized in part by dip.

As an example, dip may be specified according to the convention 301, as graphically illustrated in FIG. 3. As shown by the convention 301, the three dimensional orientation of a plane may be defined by its dip and strike. Per the convention 301, dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 301 of FIG. 3, various angles $\gamma$ indicate angle of slope downwards, for example, from an imaginary horizontal plane (e.g., flat upper surface); whereas, azimuth refers to the direction towards which a dipping plane slopes (e.g., which may be given with respect to degrees, compass directions, etc.). In the convention 301, various angles are represented by the Greek letter gamma as the Greek letter phi appears in association with various examples that include implicit modeling. Another feature shown in the convention 301 of FIG. 3 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 301 of FIG. 3). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 301 of FIG. 3). Apparent dip may be the dip of a plane as measured in any other direction except in the direction of true dip (see, e.g., $\gamma_A$ as $Dip_A$ for angle $\alpha$); however, it is possible that the apparent dip is equal to the true dip (see, e.g., $\gamma$ as $Dip_A = Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 301 of FIG. 3, the dip of a plane as seen in a cross-section perpendicular to the strike is true dip (see, e.g., the surface with $\gamma$ as $Dip_A = Dip_T$ for angle $\alpha_{90}$ with respect to the strike). As indicated, dip observed in a cross-section in any other direction is apparent dip (see, e.g., surfaces labeled $Dip_A$). Further, as shown in the convention 301 of FIG. 3, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 301 may be used with respect to an analysis, an interpretation, an attribute, a model, etc. (see, e.g., various blocks of the system 100 of FIG. 1 and the system 200 of FIG. 2). As an example, various types of features may be described, in part, by dip (e.g., sedimentary bedding, horizons, faults and fractures, cuestas, igneous dikes and sills, metamorphic foliation, etc.).

Seismic interpretation may aim to identify and classify one or more subsurface boundaries based at least in part on one or more dip parameters (e.g., angle or magnitude, azimuth, etc.). As an example, various types of features (e.g., sedimentary bedding, horizons, faults and fractures, cuestas, igneous dikes and sills, metamorphic foliation, etc.) may be described at least in part by angle, at least in part by azimuth, etc.

Referring to the plots 302, 303, 304 and 305 of FIG. 3, these may represent portions of a method that can generate a model of a geologic environment such as the geologic environment represented in the plot 300.

As an example, a volume based modeling method may include receiving input data (see, e.g., the plot 300); generating a volume mesh, which may be, for example, an unstructured tetrahedral mesh (see, e.g., the plot 302); calculating implicit function values, which may represent stratigraphy and which may be optionally rendered using a periodic map (see, e.g., the plot 303 and the implicit function $\varphi$ as represented using periodic mapping); extracting one or more horizon surfaces as iso-surfaces of the implicit function (see, e.g., the plot 304); and generating a watertight model of geological layers, which may optionally be obtained by subdividing a model at least in part via implicit function values (see, e.g., the plot 305).

As an example, an implicit function calculated for a geologic environment includes iso-values that may represent stratigraphy of modeled layers. For example, depositional interfaces identified via interpretations of seismic data (e.g., signals, reflectors, etc.) and/or on borehole data (e.g., well tops, etc.) may correspond to iso-surfaces of the implicit function. As an example, where reflectors correspond to isochronous geological sequence boundaries, an implicit function may be a monotonous function of stratigraphic age of geologic formations.

As an example, a process for creating a geological model may include: building an unstructured faulted 2D mesh (e.g., if a goal is to build a cross section of a model) or a 3D mesh from a watertight representation of a fault network; representing, according to an implicit function-based volume attribute, stratigraphy by performing interpolations on the built mesh; and cutting the built mesh based at least in part on iso-surfaces of the attribute to generate a volume representation of geological layers. Such a process may include outputting one or more portions of the volume representation of the geological layers (e.g., for a particular layer, a portion of a layer, etc.).

As an example, to represent complex depositional patterns, sequences that may be separated by one or more geological unconformities may optionally be modeled using one or more volume attributes. As an example, a method may include accounting for timing of fault activity (e.g., optionally in relationship to deposition) during construction of a model, for example, by locally editing a mesh on which interpolation is performed (e.g., between processing of two consecutive conformable sequences).

Referring to the control point constraints formulation 310, a tetrahedral cell 312 is shown as including a control point 314. As an example, an implicit function may be a scalar field. As an example, an implicit function may be represented as a property or an attribute, for example, for a volume (e.g., a volume of interest). As an example, the aforementioned PETREL® framework may include a volume attribute that includes spatially defined values that represent values of an implicit function.

As an example, as shown with respect to the linear system of equations formulation 330, a function "F" may be defined for coordinates (x, y, z) and equated with an implicit function denoted $\varphi$. As to constraint values, the function F may be such that each input horizon surface "I" corresponds to a known constant value $h_i$ of $\varphi$. For example, FIG. 3 shows nodes (e.g., vertices) of the cell 312 as including $a_0$, $a_1$, $a_2$ and $a_3$ as well as corresponding values of $\varphi$ (see column vector). As to the values value $h_i$ of $\varphi$, if a horizon I is younger than horizon J, then $h_i > h_j$ and, if one denotes $T\_ij^*$ as an average thickness between horizons I and J, then $(h_k - h_i)/(h_i - h_j) \sim T\_ik^*/Tij^*$, for which a method can include estimating values of $T\_ij^*$ before an interpolation is performed. Note that such a method may, as an example, accept lower values $h_i$ of $\varphi$ for younger horizons, where, for example, a constraint being that, within each conformal sequence, the values $h_i$ of $\varphi$ vary monotonously with respect to the age of the horizons.

As to interpolation of "F", as an example, $\varphi$ may be interpolated on nodes of a background mesh (e.g., a triangulated surface in 2D, a tetrahedral mesh in 3D, a regular structured grid, quad/octrees, etc.) according to several constraints that may be honored in a least squares sense. In such an example, as the background mesh may be discontinuous along faults, interpolation may be discontinuous as well; noting that "regularization constraints" may be included, for example, for constraining smoothness of interpolated values.

As an example, a method may include using fuzzy control point constraints. For example, at a location of interpretation points, $h_i$ of $\varphi$ (see, e.g. point a* in FIG. 3). As an example, an interpretation point may be located at a location other than that of a node of a mesh onto which an interpolation is performed, for example, as a numerical constraint may be expressed as a linear combination of values of $\varphi$ at nodes of a mesh element (e.g. a tetrahedron, tetrahedral cell, etc.) that includes the interpretation point (e.g., coefficients of a sum being barycentric coordinates of the interpretation point within the element or cell).

For example, for an interpretation point p of a horizon I located inside a tetrahedron which includes vertices are $a_0$, $a_1$, $a_2$ and $a_3$ and which barycentric coordinates are $b_0$, $b_1$, $b_2$ and $b_3$ (e.g., such that the sum of the barycentric coordinates is approximately equal to 1) in the tetrahedron, an equation may be formulated as follows:

$$b_0\varphi(a_0) + b_1\varphi(a_1) + b_2\varphi(a_2) + b_3\varphi(a_3) = h_i$$

where unknowns in the equation are $\varphi(a_0)$, $\varphi(a_1)$, $\varphi(a_2)$ and $\varphi(a_3)$. For example, refer to the control point $\varphi(a^*)$, labeled 314 in the cell 312 of the control point constraints formulation 310 of FIG. 3, with corresponding coordinates (x*, y*, z*); noting a matrix "M" for coordinates of the nodes or vertices for $a_0$, $a_1$, $a_2$ and $a_3$, (e.g., $x_0$, $y_0$, $z_0$ to $x_3$, $y_3$, $z_3$).

As an example, a number of such constraints of the foregoing type may be based on a number of interpretation points where, for example, interpretation points may be for decimated interpretation (e.g., for improving performance).

As mentioned, a process may include implementing various regularization constraints, for example, for constraining smoothness of interpolated values, of various orders (e.g., constraining smoothness of $\varphi$ or of its gradient $\nabla_\varphi$), which may be combined, for example, through a weighted least squares scheme.

As an example, a method can include constraining the gradient $\nabla_\varphi$ in a mesh element (e.g. a tetrahedron, a tetrahedral cell, etc.) to take an arithmetic average of values of the gradients of $\varphi$ (e.g., a weighted average) with respect to its neighbors (e.g., topological neighbors). As an example, one or more weighting schemes may be applied (e.g. by volume of an element) that may, for example, include defining of a topological neighborhood (e.g., by face adjacency). As an example, two geometrically "touching" mesh elements that are located on different sides of a fault may be deemed not topological neighbors, for example, as a mesh may be "unsewn" along fault surfaces (e.g., to define a set of elements or a mesh on one side of the fault and another set of elements or a mesh on the other side of the fault).

As an example, within a mesh, if one considers a mesh element $m_i$ that has n neighbors $m_j$ (e.g., for a tetrahedron), one may formulate an equation of an example of a regularization constraint as follows:

$$\nabla \varphi(m_i) = \frac{1}{n} \sum_{j=1}^{n} \nabla \varphi(m_j)$$

In such an example of a regularization constraint, solutions for which isovalues of the implicit function would form a "flat layer cake" or "nesting balls" geometries may be considered "perfectly smooth" (i.e. not violating the regularization constraint), it may be that a first one is targeted.

As an example, one or more constraints may be incorporated into a system in linear form. For example, hard constraints may be provided on nodes of a mesh (e.g., a control node). In such an example, data may be from force values at the location of well tops. As an example, a control gradient, or control gradient orientation, approach may be implemented to impose dip constraints.

Referring again to FIG. 3, the linear system of equations formulation 330 includes various types of constraints. For example, a formulation may include harmonic equation constraints, control point equation constraints (see, e.g., the control point constraints formulation 310), gradient equation constraints, constant gradient equation constraints, etc. As shown in FIG. 3, a matrix A may include a column for each node and a row for each constraint. Such a matrix may be multiplied by a column vector such as the column vector $\varphi(a_i)$ (e.g., or $\varphi$), for example, where the index "i" corresponds to a number of nodes, vertices, etc. for a mesh (e.g., a double index may be used, for example, $a_{ij}$, where j represents an element or cell index). As shown in the example of FIG. 3, the product of A and the vector $\varphi$ may be equated to a column vector F (e.g., including non-zero entries where appropriate, for example, consider $\phi_{control\ point}$ and $\phi_{gradient}$).

FIG. 3 shows an example of a harmonic constraint graphic 334 and an example of a constant gradient constraint graphic 338. As shown per the graphic 334, nodes may be constrained by a linear equation of a harmonic constraint (e.g., by topological neighbors of a common node). As shown per the graphic 338, two tetrahedra may share a common face (cross-hatched), which is constrained to share a common value of a gradient of the implicit function $\varphi$, which, in the example of FIG. 3, constrains the value of $\varphi$ at the 5 nodes of the two tetrahedra.

As an example, regularization constraints may be used to control interpolation of an implicit function, for example, by constraining variations of a gradient of the implicit function. As an example, constraints may be implemented by specifying (e.g., as a linear least square constraint) that the gradient should be similar in two co-incident elements of a mesh or, for example, by specifying that, for individual elements of a mesh, that a gradient of the implicit function should be an average of the gradients of the neighboring elements. In geological terms, such constraints may translate to (1) minimization of variations of dip and thickness of individual layers, horizontally, and (2) to minimization of the change of relative layer thicknesses, vertically.

As an example, aforementioned effects as to minimization of variations and minimization of changes may impact a resulting model. As an example, a method may include applying one or more techniques that may counter such effects, for example, by splitting a linear system of equations formulation, by splitting one or more trends, etc. As an example, one or more of such techniques may be implemented in response to input data (e.g., seismic interpretation, bore observations, etc.) that indicates that variations of dip, thickness of one or more layers exceed one or more criteria. For example, consider a criterion that acts to classify dip as being large (e.g., more than about 10 degrees of variation of dip of a geological interface), a criterion that acts to classify thickness as being varied (e.g., more than doubling of thickness of a layer from one part to another of a model), etc.

As an example, schematically, computation of an implicit function may be performed in a manner that aims to honor two types of constraints: (1) the minimization of the misfit between the interpretation data and the interpolated surfaces and (2) a regularization constraint that aims to ensure smoothness and monotonicity of an interpolated property.

As explained, values of an implicit function at nodes of a volume mesh may be determined by solving a sparse linear system of equations (see, e.g., the linear system of equations formulation 330 of FIG. 3). As shown in FIG. 3, various constraints may be applied, which may, for example, be selected in an effort to better constrain one or more features (e.g., local dip of a geological layer, etc.) by constraining a gradient of the implicit function. As an example, a solution procedure may include honoring one or more constraints in a least square sense, for example, using a weighted least square scheme that may act to balance effects of contradicting constraints in a solution for a linear system of equations.

As an example, a method may include relaxing one or more regularization constraints used for interpolating an implicit functions, for example, such that the interpolation can account for one or more high frequency thickness variations (e.g., high frequency in terms of a spatial domain).

As an example, a method may include removing one or more low frequency trends of thickness variations from data (e.g., input data, etc.), optionally prior to performing an interpolation of an implicit function, and, for example, adding the one or more trends (e.g., as appropriate) back to the implicit function. As an example, such an approach may be applied to complex faulted reservoirs, for example, optionally independently from fault offsets.

As an example, one or more methods may be applied for interpolating an implicit function, for example, with the purpose of representing a set of conformable (e.g., non-intersecting) layers. As an example, a method may employ one or more techniques, for example, a method may employ a relaxation technique, an extraction technique or a relaxation technique and an extraction technique.

Figure 4:
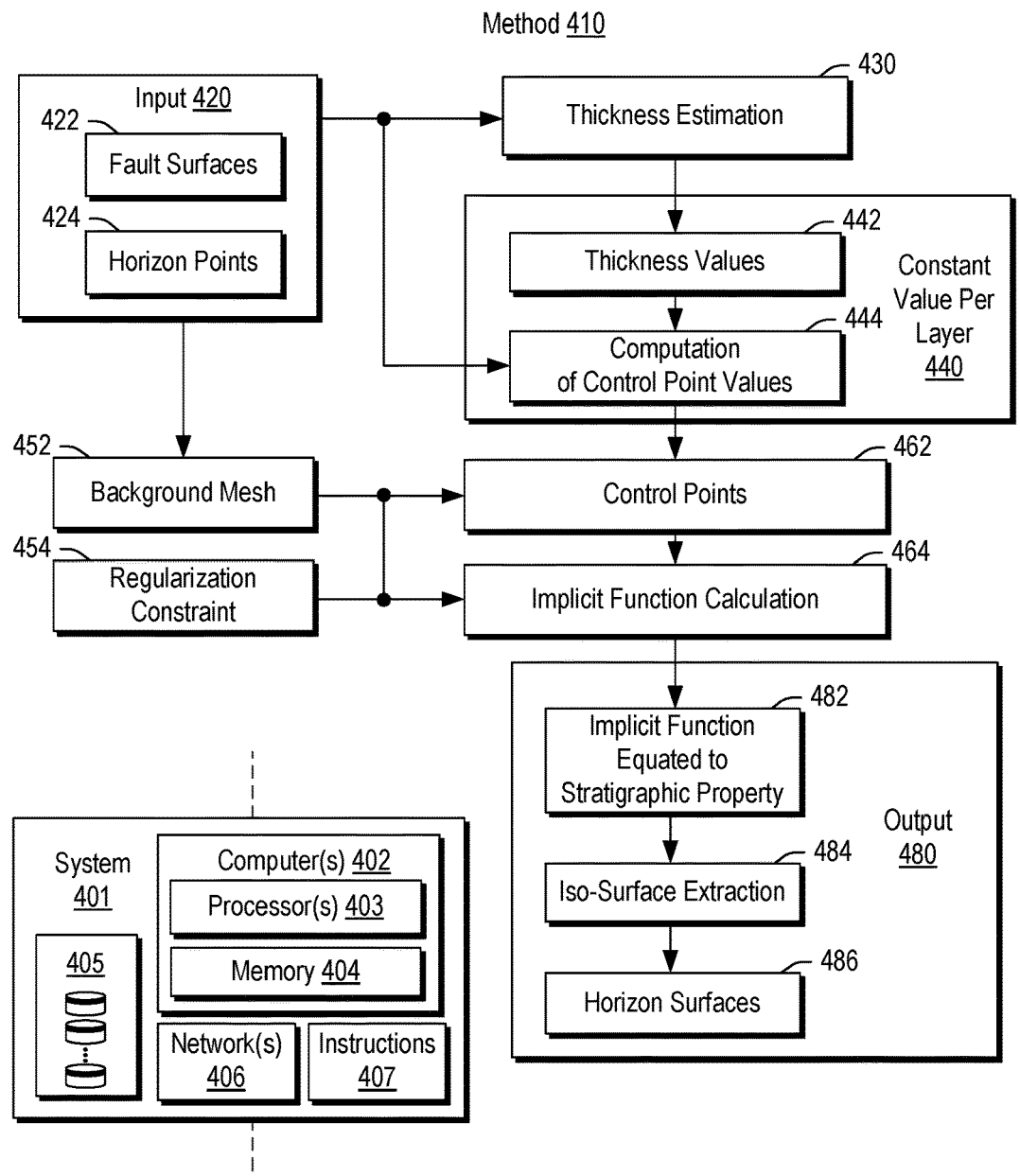
FIG. 4 illustrates an example of a system and an example of a method.

FIG. 4 shows an example of a system 401 and a method 410. As shown in FIG. 4, the system 401 includes one or more computers 402, one or more storage devices 405, one or more networks 406 and one or more modules 407. As to the one or more computers 402, each computer may include one or more processors (e.g., or processing cores) 403 and memory 404 for storing instructions (e.g., sets of instructions, etc.), for example, executable by at least one of the one or more processors. As an example, a computer may include one or more network interfaces (e.g., wired or wireless), one or more graphics cards, a display interface (e.g., wired or wireless), etc. As an example, data may be provided in the storage device(s) 405 where the computer(s) 402 may access the data via the network(s) 406 and process the data via the module(s) 407, for example, as stored in the memory 404 and executed by the processor(s) 403.

As an example, a computer or a computing system may include a display or displays. As an example, one or more graphical user interfaces (GUIs) may be rendered to a display or displays. As an example, a display may be a touch screen display. As an example, a computer or a computing system can include one or more input devices and/or input mechanisms. As an example, a GUI may be rendered to a display where an input device and/or an input mechanism allows for interactions.

FIG. 4 also shows a block diagram of the method 410, which includes an input block 420 and output block 480, for example, to output an implicit function equated to a stratigraphic property per a block 482. As to the input block 420, it may include a fault surfaces input block 422 and a horizon points input block 424. As shown in the example of FIG. 4, the input block 420 may provide input to a thickness estimation block 430, a layer block 440 and a background mesh block 452.

As to the layer block 440, it can include a thickness values block 442 for determining or receiving thickness values (e.g., based on or from the thickness estimation block 430) and a computation block 444 for computing control point values (see, e.g., the formulations 310 and 330 of FIG. 3). As shown, the layer block 440 can output control points to a control points block 462, which may be defined with respect to a mesh provided by the background mesh block 452. As an example, the control points of the control points block 462 may account for one or more regularization constraints per a regularization constraint block 454.

As an example, given control point values for layers definable with respect to a mesh and subject to one or more constraints, a method can include calculating values of an implicit function (e.g., or implicit functions). As shown in the example of FIG. 4, an implicit function calculation block 462 can receive control points and one or more constraints defined with respect to a mesh (e.g., elements, cells, nodes, vertices, etc.) and, in turn, calculate values for one or more implicit functions.

As to the output block 480, given calculated values for one or more implicit functions, these may be associated with, for example, a stratigraphic property per the block 482. As an example, one or more iso-surfaces may be extracted based at least in part on the values of the stratigraphic property per an iso-surface extraction block 484, for example, where one or more of the extracted iso-surfaces may be defined to be a horizon surface (e.g., or horizon surfaces) per a horizon surface block 486.

FIG. 4 also shows an example of a method 490 for outputting a volume based model (e.g., a model constructed from a subdivision of a volume of interest in sub-volumes representing stratigraphic layers, fault blocks or segments, etc.). As shown, the method 490 includes an input block 491 for inputting information (e.g., sealed fault framework information, horizon interpretation information, etc.), a mesh block 492 for providing or constructing a mesh, a volume attribute interpolation block 493 for interpolating values (e.g., using one or more implicit functions), an iso-surface extraction block 494 for extracting one or more iso-surfaces (e.g., based at least in part on the interpolated values), a subdivision block 495 for subdividing a meshed volume (e.g., based at least in part on one or more of the one or more extracted iso-surfaces) and an output block 496 for outputting a volume based model (e.g., based at least in part on one or more portions of a subdivided meshed volume).

As an example, the input block 491 may include one or more features of the input block 420 of the method 410, the mesh block 492 may include one or more features of the mesh block 452 of the method 410, the volume attribute interpolation block 493 may include one or more features of the implicit function calculation block 464 and/or the stratigraphic property block 482 of the method 410, the iso-surface extraction block 494 may include one or more features of the iso-surface extraction block 484 of the method 410, the subdivision block 495 may include subdividing a meshed volume using one or more horizon surfaces per the horizon surfaces block 486 of the method 410 and the output block 496 may include outputting a volume based model based at least in part on one or more outputs of the output block 480 of the method 410.

As explained with respect to the method 410 of FIG. 4, an implicit function may be provided for performing, for example, interpolation. As an example, an implicit modeling approach can include representing surfaces as iso-values of a volume attribute (e.g., of an implicit function). As an example, such a volume attribute may be referred to as being a "thickness proportion" (e.g., volumetrically filling in space). For example, an implicit function may correspond to the stratigraphic age of formations and, for example, such an implicit function may be embedded and interpolated in a volumetrically filling tetrahedral mesh (e.g., structured, unstructured, etc.).

As an example, a method can include building a tetrahedral mesh (e.g., or other type of mesh) for carrying and interpolating an implicit function. As an example, a 3D boundary-constrained Delaunay mesh generator may be implemented, for example, with constraints such as constraints based on faults affecting considered horizons where such faults may be accounted for as internal boundaries during mesh generation, for example, where some border faces of tetrahedra may match fault geometries in a resulting mesh. As an implicit function may be defined and interpolated on nodes of a tetrahedral mesh, density of the mesh, and therefore the spatial resolution of the implicit function, may be controlled, for example, to include a higher density within a shell at, proximate to or around various data and/or faults (e.g., to maximize degree of freedom of an interpolation at or near various data and/or faults). As an example, a mesh adaptation process may include producing tetrahedra that have a vertical resolution higher than their areal resolution (e.g., to better capture thickness variations in layering). As an example, a resulting mesh (e.g., a built mesh) may be unstructured.

As an example, a method can include interpolating values of an implicit function on nodes of a tetrahedral mesh. As an example, an interpolation process may include using a linear least squares formulation, which may tend to minimize misfit between interpretation data and interpolated surfaces and to minimize variations of dip and thickness of layers.

As an example, a method can include generating surfaces representing individual implicitly modeled horizons. In such an example, as the specific value of the implicit function associated to each of the individual horizons may be known, a method may include using an iso-surfacing algorithm. As an example, resolution of a resulting surface or surfaces may be higher or approximately equal to a local resolution of a tetrahedral mesh around sample points (e.g., which may be user-controllable).

As an example, a method may include a volume based modeling approach that generates a consistent zone model (e.g., a model of interpreted geological layers). For example, such a zone model may include an individual geological layer that may be seen as an interval of values of an implicit function. In such an example, given its value of the implicit function, a method may determine to which layer an arbitrary point belongs, in particular where such arbitrary points correspond to nodes of a mesh supporting the implicit function.

As an example, edges of a tetrahedral mesh may intersect limits of geological layers. In such an example, construction of such intersection points may have been computed where they correspond to nodes of triangulated surfaces representing horizons. Accordingly, zones may be built by cutting edges of the tetrahedral mesh by some iso-surfaces of the implicit function.

As an example, a method can include cutting a volume to produce zones that are sets of tetrahedra. As an example, a method can include cutting volume borders to produce zones that are sets of triangulated patches. As to the latter, it may include cutting volume borders by iso-contours. As noted, one or more implicit functions may be formulated for determination of iso-surfaces and/or iso-contours that do not intersect one another other.

As an example, a volume based modeling approach may be less sensitive to complexity of a fault network and may provide conformable horizons belonging to a common conformable sequence (e.g., which may be modeled simultaneously). As to the latter, by using an implicit approach (e.g., by representing sets of conformable horizons by several iso-values of a common implicit attribute), the approach may avoid crossing of conformable horizons.

As an example, a volume based modeling approach may provide for conformable horizons that constrain geometry of other conformable horizons that belong to a common sequence, which itself may be constrained by geometry. As an example, a volume based modeling approach may be applied in scenarios where data are sparse, for example, consider data from well tops, 2D sections, etc. As an example, one or more surfaces may be modeled using seismic data and, for example, globally adjusted using well top data.

As an example, a volume based modeling approach may include outputting geometry of a horizon as well as volume attribute values, which may be defined within a volume of interest and, for example, represent a stratigraphic age, or relative chronostratigraphic age, of a formation (or formations).

As an example, the method 410 of FIG. 4 may include outputting one or more models (e.g., a mesh or meshes, etc.) that account for various features of a geologic environment, for example, where the output model or models is volume filling (e.g., "watertight" or "sealed").

As an example, a method may be implemented to create a reservoir model on a "conformable sequence per conformable sequence" basis, for example, where surfaces belonging to a common conformable sequence may be interpolated simultaneously. As an example, a method can include iteratively editing topology of a volume mesh, for example, to control extent of the volume in which an interpolation is performed and continuity of an interpolated implicit function. As an example, a method may include producing layering that is consistent with a geological style of deposition in one or more eroded areas.

As an example, a method can include building a background mesh, for example, where the background volume mesh covers a volume of interest (VOI), which itself may be of a size sufficient to include horizons to be modeled.

An approach to estimation of structural uncertainties can include "deforming", using one or more of various techniques (e.g., mathematical or mechanical), a pre-defined and rigid "structural model". Such an approach may be undertaken where no "inter-object" relationships (e.g. fault-fault intersection and truncation styles) are altered.

As an example, advanced uncertainty estimations may assume that the relationships and the contact styles between structural objects are the result of interpretation and thus uncertainty (e.g., human interpretation uncertainty, machine interpretation uncertainty, etc.). As an example, an approach that allows for various permutations of these contacts can allow for capture of a broader view of an uncertainty spectrum or spectra, which may provide a more realistic understanding of structures in a geologic environment.

Figure 5:
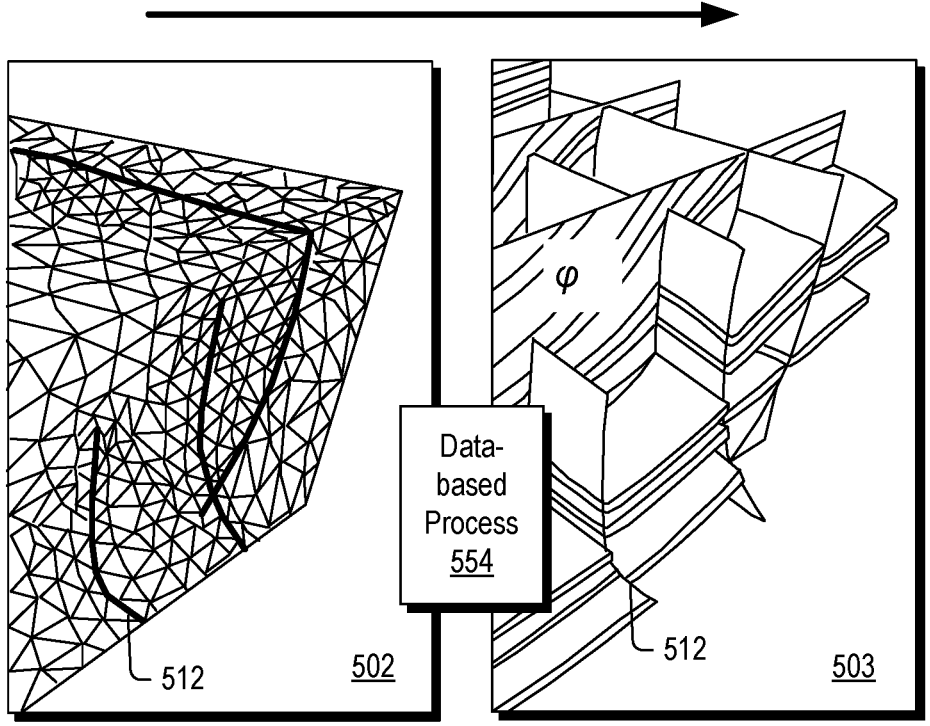
FIG. 5 illustrates examples of methods.
Figure 5:
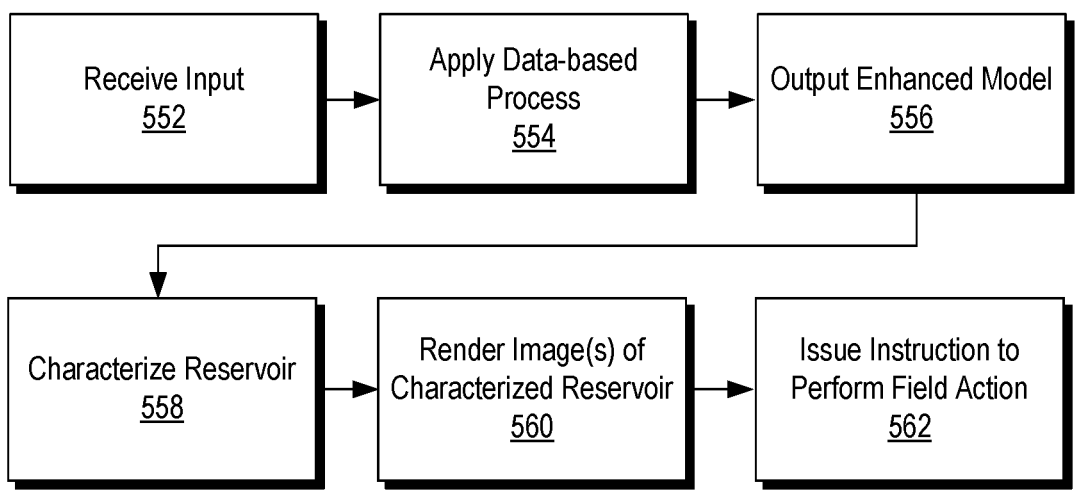

FIG. 5 shows an example of a method 500 and an example of a method 550. As shown, the method 500 includes a mesh generation block 502 and an implicit function solution block 503; noting that a meshless approach may be utilized. The method 500 includes a mesh block 502 and an implicit function block 503 where the implicit function block 503 includes calculating implicit function values based at least in part on a mesh of the mesh block 502 (e.g., or nodes, etc., of a meshless approach). As explained, implicit function values may be utilized to identify, define, etc., structural features of a geologic region that has been surveyed to acquire geophysical data. As an example, implicit function values may be calculated where a geologic region includes one or more faults 512.

As an example, the method 500 may be part of another method such as the method 550. In particular, the method 500 may include a data-based process 554 that aims to increase accuracy of the implicit function and hence accuracy of a structural model of a geologic region.

As shown in FIG. 5, the method 550 includes a reception block 552 for receiving input, an application block 554 for applying a data-based process to calculate implicit function values, an output block 556 for outputting an enhanced model that is based at least in part on the implicit function values, a characterization block 558 for characterizing a reservoir, a render block 560 for rendering one or more images of the characterized reservoir to a display, and an issuance block 562 for issuing an instruction to perform a field action, which can include controlling one or more pieces of field equipment to perform a field action on the characterized reservoir (e.g., according to one or more structural features as accurately represented in the enhanced model).

As an example, the data-based process block 554 can include implementing a weighted curvature minimization (WCM) criterion to one or more spatially located data points, for example, while also implementing one or more smoothness criteria. In such an example, the WCM criterion can allow for a localized increase in a gradient of an implicit function within a neighborhood of a spatially located data point. Such an approach can help to reduce inaccurate implicit function values, which may be geologically unrealistic.

Figure 6:
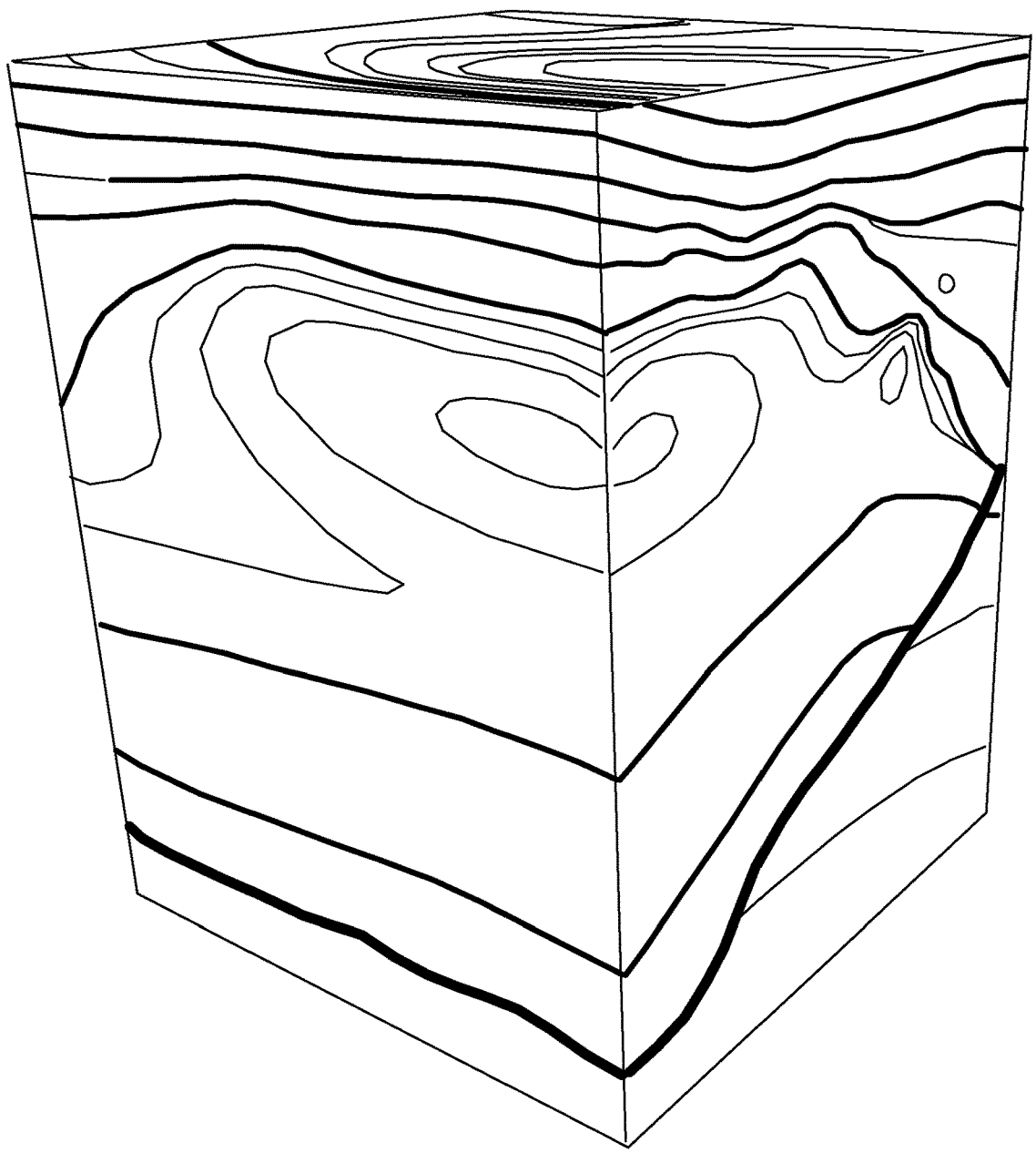
FIG. 6 illustrates an example of a model of a geologic region.

FIG. 6 shows an example of a model 600 of a geologic region that includes various features such as a fault, represented by a thick black line. Various other features include horizons, as relatively planar surfaces. Additionally, the model 600 shows implicit function values as contours that are closed. Such implicit function values, while being based at least in part on data acquired for the geologic region, can be erroneous and can decrease model accuracy, decrease accuracy of images, decrease accuracy as to characterization of the geologic region, which may include a reservoir from which fluid is to be produced.

As mentioned with respect to the method 410 of FIG. 4, an implicit function calculation (see, e.g., block 464) is based on input (see, e.g., block 420), which includes data acquired via one or more sensors in a geologic environment. For example, the horizon points 424 may be generated via interpretation of seismic data where seismic data are rendered to a display as an image from which a graphical user interface can be utilized to mark points on the image where the points are believed to be horizons. A horizon can be an interface that might be represented by a seismic reflection, such as the contact between two bodies of rock having different seismic velocity, density, porosity, fluid content, etc. Accordingly, a picked horizon point is intended to correspond to an interface where seismic energy has been reflected and received by a sensor or sensors that can, via circuitry, transform the reflected energy into digital data, which can be raw seismic data, for example, in the form of traces (e.g., seismic energy amplitude variations with respect to time, etc.).

As an example, interpretation and model building based thereon can be based on stratigraphy, such as event stratigraphy, which involves correlation of sedimentary sequences via marker beds or event horizons. These beds and horizons represent synchronous surfaces that are surfaces believed to have developed at the same time, and, as a consequence, they may separate an older sequence below them from a younger sequence above them.

In event stratigraphy, a marker bed is a bed, or horizon (e.g., a thin subdivision of a layer) with characteristics distinctly different from those of the host sediment above and below it. A marker bed may be viewed in seismic images as extending over relatively long distances. An event horizon is a discontinuity surface in an otherwise "normal" sequence, or a layer with exceptional fossil content, or with specific characteristics within a sequence.

An event can be one of various kinds of depositional, non-depositional or erosional episode that occurred synchronously (at the same time) within a sedimentary basin. These types of episodes or events can be controlled and/or triggered by the physical environment (for instance, volcanic eruptions, tsunamis, turbidites, storms, etc.). Some events do not affect directly the sedimentary record but rather the faunas and floras. As a consequence, an event may be marked by a change or an anomaly in the fossil record.

Depositional events may occur within hours or days, or instantaneously from a geologic point of view. Some examples of synchronous deposits include: shallow-marine storm sands (tempestites), and tsunami deposits; gravity flow deposits and turbidites; deposits controlled by relative sea-level change; continental deposits, such as those left by sheetfloods and flash floods; and volcanic ash layers and other volcaniclastic (pyroclastic) sediments, known as tephra.

Non-depositional and erosional events do not create distinct beds as there is no sediment available; rather such an event or events can leave a trace, a mark, at a specific surface or horizon. As to some examples, consider paleosols, coal seams, and karst surfaces as well as underwater examples such as lag deposits (e.g., deposits of material left behind by currents or waves in shallow waters, such as shell beds, coarse sands beds, beds of minerals and concretions that form and/or concentrate in these conditions).

Some physical events tend to be less prevalent, such as, for example, shallow-marine storm sands; meteorite impacts (such an impact would form characteristic sedimentary layers and/or leave behind traces of a specific elements, as in the case of the iridium at the K/Pg boundary); and earthquakes (earthquakes might trigger the formation of distinct deposits, called seismites, that would be synchronous over a certain area).

Biological events can include a sudden appearance of new taxa in the rock record, which may reflect a drastic change in environmental conditions (a climate change, a change in water currents or chemistry, a change in the amount of nutrients, a change in the oxygen content of the water, etc.).

As explained, beds and horizons can represent synchronous surfaces that are surfaces believed to have developed at the same time, and, as a consequence, they may separate an older sequence below them from a younger sequence above them. Further, a horizon can include characteristics distinctly different from those of sediment above it and below it and can extend over relatively long distances.

Horizons can be interpreted via seismic data and other types of data, where such data may be discrete (e.g., for a particular borehole) or may be relatively expansive (e.g., for a seismic survey). A seismic survey can generate a seismic volume, which is a 3D array of seismic data. The resolution of a seismic survey and corresponding data may be of the order of 100 meters by 100 meters laterally, which can be set by an acquisition geometry, whether land-based or marine. In interpretation, an interpreter may select various points in a seismic data image, where the points have a resolution less than that of the seismic data (e.g., less than that of the image). For example, as an interpreter may understand that a horizon is laterally expansive, the interpreter may select 10 points from a 1024×1024 pixel image that is based on seismic data. Where the image represents a lateral span of tens of kilometers, the 10 selected points may be 1000 meters or more apart. However, as the horizon is expected to be laterally expansive, with slowly varying shape, which may be minimal, the 10 selected points may suffice for construction of a corresponding portion of a model of the surveyed geologic region. Further, to create a "smooth" model horizon, smoothing may be utilized in the process of model generation, which may be smoothing imposed via one or more constraints, for example, as explained with respect to FIG. 3.

As mentioned with respect to FIG. 3, as to interpolation of "F", as an example, $\varphi$ may be interpolated on nodes of a background mesh (e.g., a triangulated surface in 2D, a tetrahedral mesh in 3D, a regular structured grid, quad/octrees, etc.) according to several constraints that may be honored in a least squares sense. In such an example, as the background mesh may be discontinuous along faults, interpolation may be discontinuous as well; noting that "regularization constraints" may be included, for example, for constraining smoothness of interpolated values. As shown in FIG. 3, the constraints in the A of the linear system 330 can include gradient constraints (e.g., gradient and constant gradient). Gradient constraints can, at times, result in sub-optimal implicit function values. For example, consider the model 600 of FIG. 6 where some implicit function values result in closed contours, which may not correspond to physical structures in a geologic region.

Implicit structural modeling can aim to define, for individual points in a two-dimensional scenario, denoted (x,y), corresponding implicit function values f(x,y). In such an example, the function "f" may be projected on a z axis in a 3D orthogonal space (x,y,z) such as z(x,y)=f(x,y). In such an approach, 2D implicit structural modeling can be understood as a 3D single surface creation problem.

Minimizing curvature of an implicit function in a 2D space can be akin to smoothing a 3D surface. Thus, it can also be viewed as minimizing the curvature of the 3D surface.

As an example, minimizing a surface's curvature may be accomplished by solving the bi-harmonic equation for points in a space:

$$\Delta^2 f(x,y)=0$$

with $\Delta^2$ the bi-harmonic operator.

Note again that in FIG. 3, one of the constraints is shown to be a harmonic constraint, which can accompany particular gradient constraints.

As to the Discrete Smooth Interpolation (DSI) method, the forgoing bi-harmonic equation is approximated by minimizing gradient variation of the implicit function in a least squares sense.

As an example, a method can include a different approach, alternatively or additional. For example, consider minimization of energy under constraints, which can include minimizing bending energy, solving the bi-harmonic equation with data as constraints. Such an approach may be considered a potential method, where an energy potential concept is employed.

In a potential method, data points can be set to be respected and a surface smoothed in a neighborhood around each data point. In DSI and a minimization of energy approach, the smoothness impact on the results can be increased. In both cases, the curvature minimization is performed with the same strength within the studied space. In a thickness variation problem, this regularity in the smoothness impact can be a reason why thickness variation issues are not dealt properly, which results in a suboptimal model.

Figure 7:
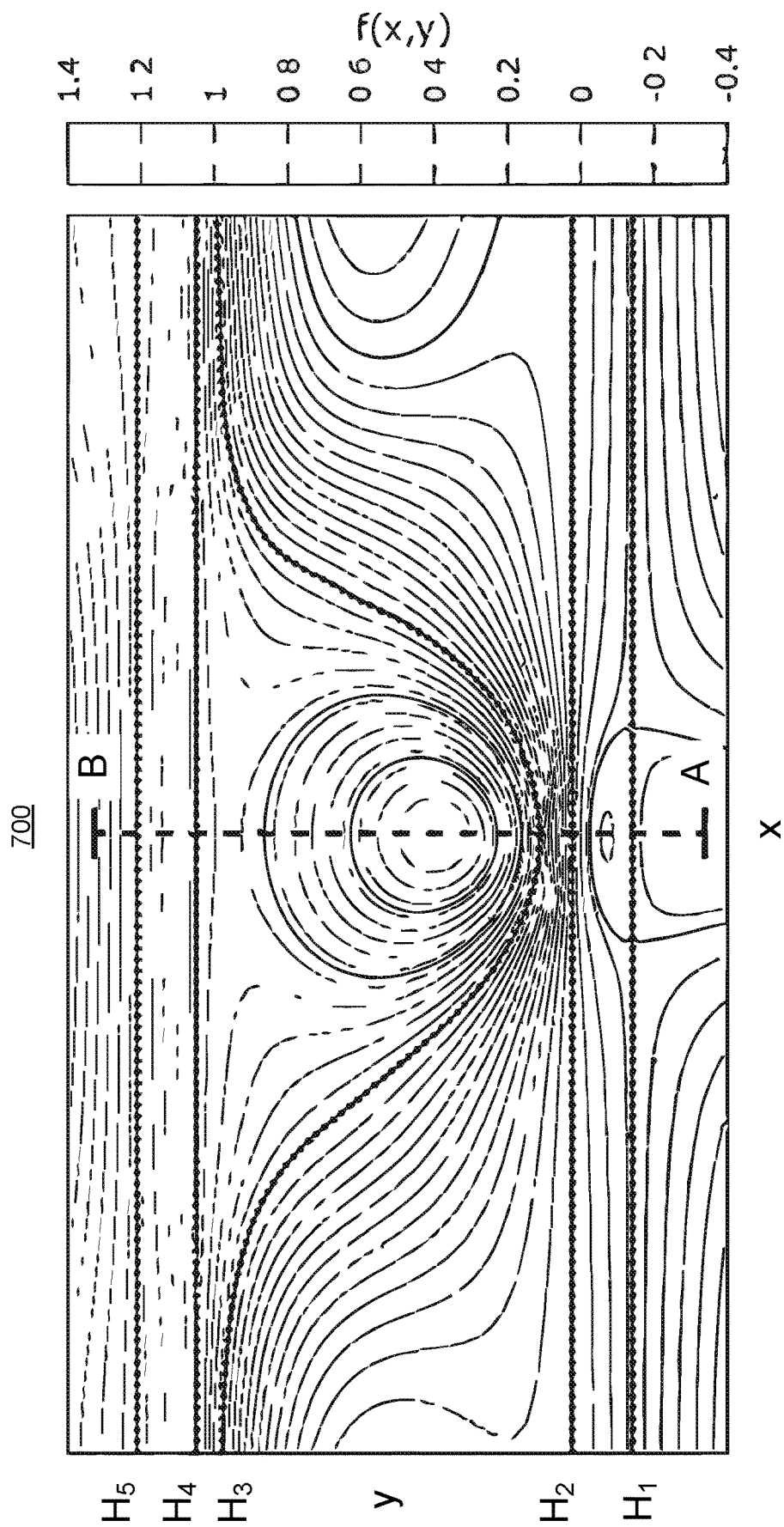
FIG. 7 illustrates an example of a model of a geologic region.

FIG. 7 shows a plot 700 of implicit function values in an x, y plane for a geologic region where horizons are identified as $H_1$, $H_2$, $H_3$, $H_4$ and $H_5$. As an example, implicit functions values can define a model. For example, the plot 700 can be a plot that includes layers of a model of a geologic region, which may be a mesh based model, a meshless model, etc. Such a model can be utilized for one or more purposes, for example, to perform a workflow that includes simulating physical phenomena via a simulator (e.g., a reservoir simulator, etc.) to perform one or more field actions using model-based simulation results. For example, consider a drilling action that targets a particular layer of the Earth (e.g., a more accurate borehole trajectory for a well, etc.), which can be a reservoir layer. Or, for example, consider an injection action that injects fluid into a layer or layers of the Earth and/or a production action that produces fluid from a layer or layers of the Earth. In such examples, a more accurate model of a geological region can guide an action or actions spatially and/or functionally.

As shown, the implicit function values range from −0.4 to 1.4. In the example of FIG. 7, the plot 700 shows each of the horizons as corresponding to a particular implicit function value. Between the horizons, the implicit function values are shown to include closed contours, which is inaccurate geologically. In other words, the process of interpreting data for a geologic region is suboptimal as erroneous information exists in the plot 700. Such erroneous information may be understood as such, however, regions may exist in the plot 700 where it is not clear to an interpreter that implicit function values are lacking in accuracy. Where modeling building follows, such model building may generate a model that is lacking in accuracy, which, in turn, may impact one or more field operations.

Figure 8:
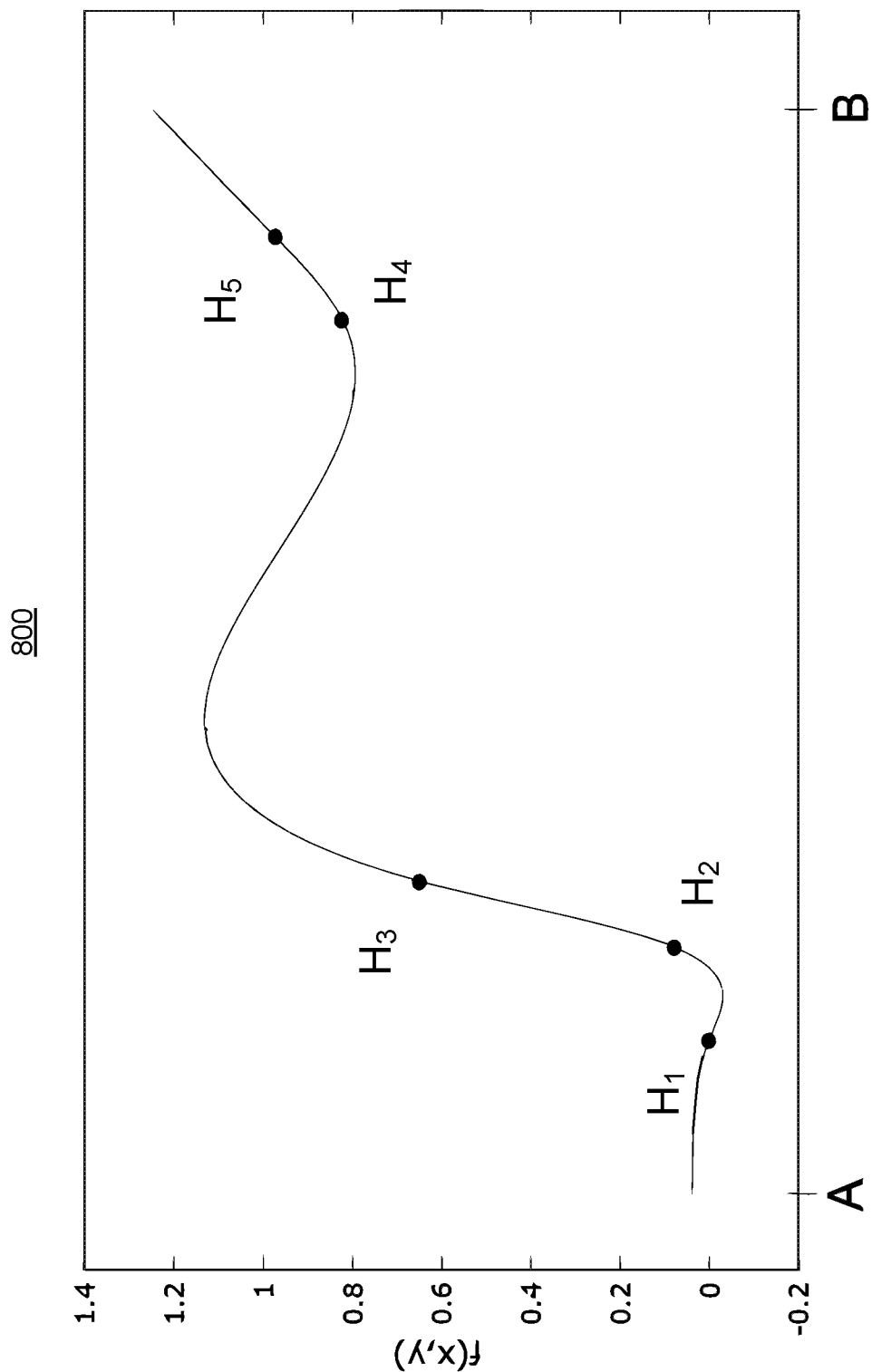
FIG. 8 illustrates an example of a plot of a section of the model of FIG. 7.

FIG. 8 shows an example of a plot 800 of the line from A-B illustrated in the plot 700 of FIG. 7. Specifically, the plot 800 shows implicit function values for the horizons in a direction from a lesser y value to a greater y value. In the examples of FIG. 7 and FIG. 8, the y direction may correspond to depth. As such, one may expect to intersect a series of horizons in going from a lower depth (deeper point in the Earth) to an upper depth (shallower point in the Earth).

As the plot 700 of FIG. 7 includes closed contours along the line A-B, the impact of those closed contours can be seen in the plot 800, where implicit function values increase to have a local maximum between the implicit function values of the horizon $H_3$ and the horizon $H_4$. Further, there is a local minimum in implicit function values between the horizons $H_1$ and $H_2$. Accordingly, the plot 800 has highlighted particular issues that exist in the calculated implicit function values for the region of the plot 700.

Specifically, in the plot 800 of FIG. 8, one can observe that the gradient between horizons $H_2$ and $H_3$ imposes to pass twice by the same z value between horizons $H_1$ and $H_2$, and between horizon $H_3$ and $H_4$, which a result of keeping the globally smoothest surface possible. In other words, striving for smoothness has results in inaccuracies.

The repetition of z values between two horizons in the cross-section along the line A-B is represented, in 2D, by closed contours (e.g., circles, etc.) in the implicit function. Such inaccuracies may be holes or bumps in a 3D surface concept. For example, striving for smoothness can create isolated closed curves of iso-values that are inconsistent with data and geological knowledge. Referring to the output block 480 of the method 410 of FIG. 4, inaccuracies can impact the output, for example, via confounding iso-surface extraction as some implicit function values may be multivalued across a slice (see the repetition of z values in the plot 800 of FIG. 8).

In the case of implicit structural modeling based on the smoothness assumption, there can exist a contradiction between an aim to globally (and constantly) minimize the curvature (e.g., smooth a 3D surface), and being able to handle thickness variation in layers of a geologic region, particularly where layers differ from those of a horizontal layer cake model (e.g., a depositional model, etc.).

As an example, a method can include consideration of the physical meaning of implicit structural modeling where, in a 2D scenario, it can be understood as creating a 3D surface, with minimizing its curvature to find the most geologically accurate solution. As explained above, minimization tends to be applied globally, with a constant strength on a surface.

As an example, a method can include weighting smoothness differently according to a proximity to information such as data (e.g., spatially located data). Such an approach may include use of a Weighted Curvature Minimization (WCM) criterion, which can handle thickness variations while preserving benefits of a smoothness criterion.

For example, a WCM criterion may be implemented by giving a smaller weight on the smoothness around data points to concentrate the curvature around these points while continuing to strongly minimize the curvature far from the data. Such an approach can help to address thickness variation problems while reducing creation of holes and/or bumps in an implicit function.

Figure 9:
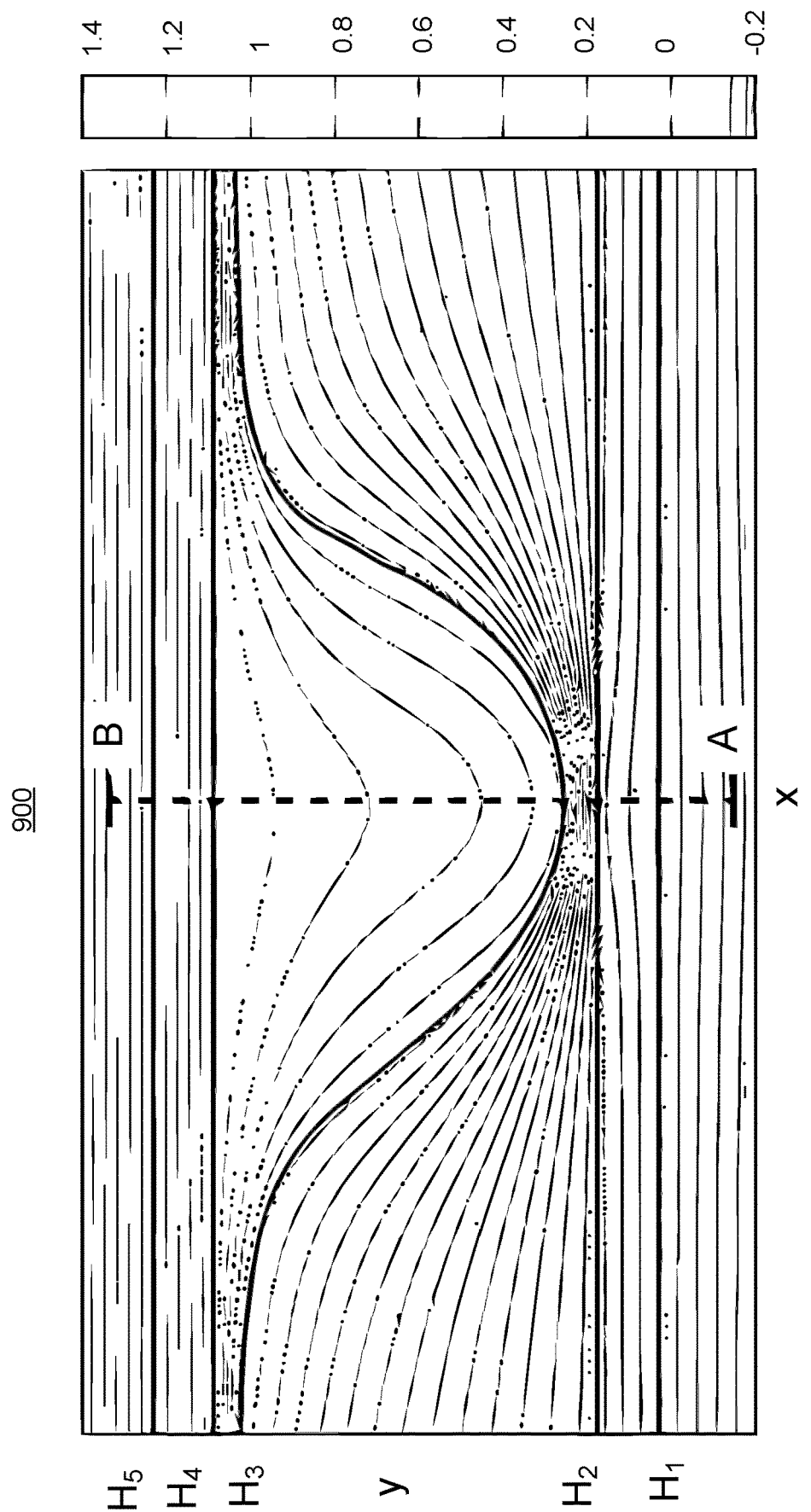
FIG. 9 illustrates an example of a model of a geologic region subject to a weighted curvature minimization criterion.

FIG. 9 shows an example of a plot 900 for the corresponding geologic region of the plot 700 of FIG. 7; however, the implicit function does not include closed curves between the horizons $H_1$ and $H_2$ or the horizons $H_3$ and $H_4$.

Figure 10:
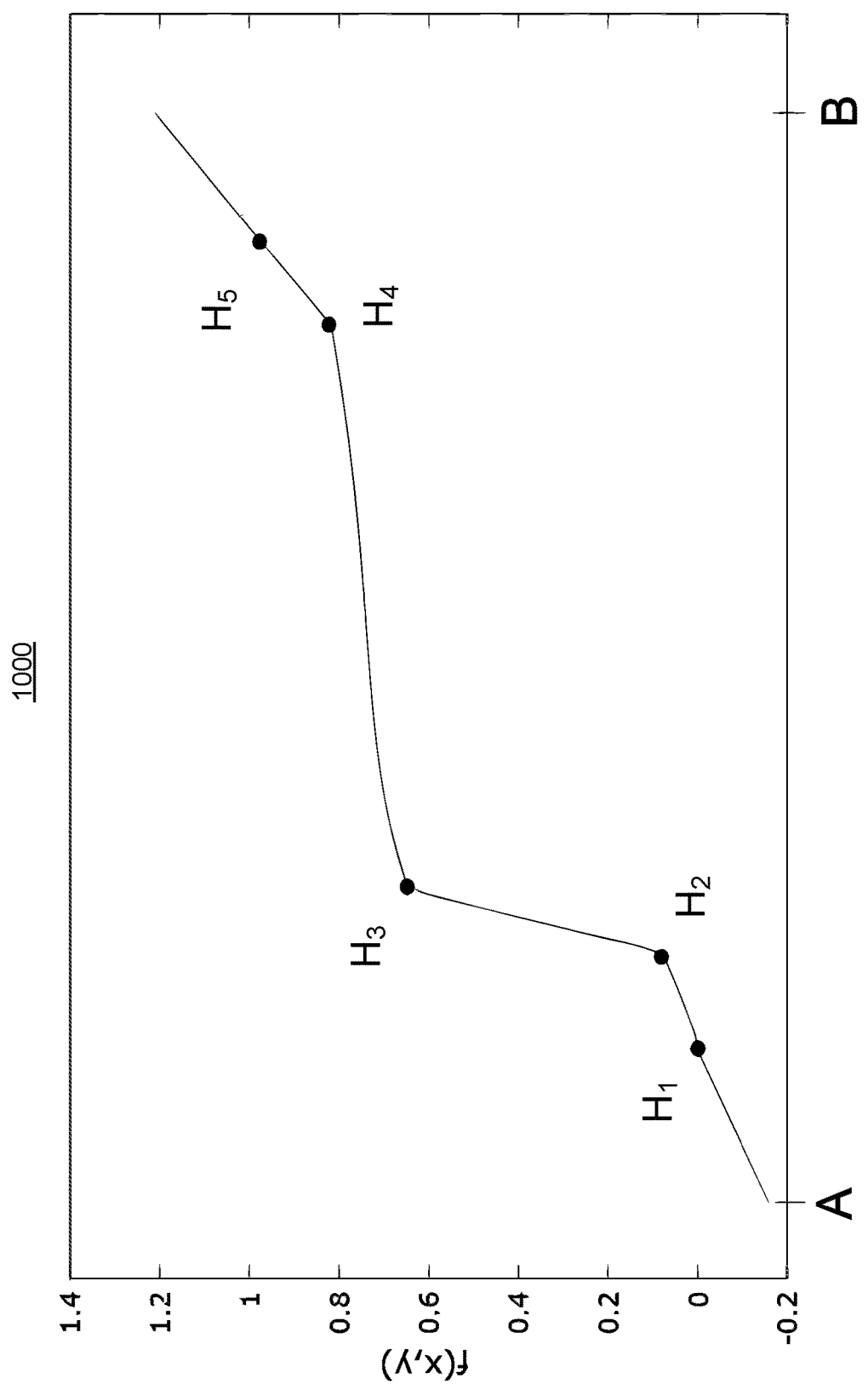
FIG. 10 illustrates an example of a plot of a section of the model of FIG. 9.

FIG. 10 shows an example of a plot 1000 for the plot 900 of FIG. 9 along a line A to B. In contrast to the plot 800 of FIG. 8, in the plot 1000, each z value has a single corresponding implicit function value.

As an example, a WCM criterion can include getting closer and closer to a piecewise definite implicit function. In 2D, as explained with respect to the plot 1000, such an approach can reduce occurrence of z-value repetitions and make the implicit function follow smoothly thickness variations.

Specifically, the plot 900 of FIG. 9 is of an implicit function generated with the WCM criterion added to the smoothness assumption on a thickness variation problem (same as FIG. 7). The WCM reduces the creation of circles and makes iso-values follow smoothly the thickness variation. This result is consistent with the data and pertinent with structural observations.

Again, as to the plot 1000 of FIG. 10, it shows a cross-section between A and B in the plot 900 of FIG. 9. In the plot 1000, the WCM's effects on the smoothness assumption is to tend to an almost piecewise definite function. As the evolution is represented by almost linear pieces of functions, repetitions of "f" values do not occur, which is the reason why no closed curves are obtained in the map view of the plot 900 of FIG. 9.

As an example, WCM criterion may be implemented in a manner that suits a particular application. For example, consider model building based on seismic survey data that is subjected to picking to provide a plurality of spatially located data points where one or more actions may be performed in the field based at least in part on the model built, where the model is to accurately represent a geologic region that is surveyed. Such actions can include, for example, drilling where a trajectory of a borehole being drilled is to pass into a particular formation that may be represented as a layer in the model. In such an example, the drilling can be directional drilling where a drill bit is steered to pass into the particular formation (e.g., a reservoir formation).

As an example, consider an approach that writes the smoothness assumption on discretization points such as in methods like DSI or energy minimization under constraints. In such cases, the WCM criterion can involve weighting differently the smoothness equations in the system of equations (e.g., least squares system for DSI, and square system for energy minimization) to be solved. As an example, the WCM criterion can be implemented such that the closer a discretization point gets to a data point, the smaller influence its smoothness equation has on the system of equations. The spatial evolution of the weights can be continuous or not, and the system of equations can remain stable. Thus, the evolution of the weight(s) can be flexible in implementation without impacting stability of solving for implicit function values.

As an example, a WCM criterion can be used for methods such as the potential method. In such an example, the method can include expressing the smoothness assumption differently depending on the localization. For example, the spline smoothing approach can be used for smoothing a model using:

$$\text{Min}(J) = \text{Min}(\Sigma_i^{N_c} |f(X_i) - f_i|^2 + \alpha T),$$

$$\text{With} \begin{cases} \alpha: \text{ fixed value} \\ T = \int \Omega |f^{(2)}|^2 (X) dX \end{cases}$$

and $f(X) = f(x,y)$, $N_c$ the number of data points, and $f_i$ the data's horizon iso-value.

In such an example, a method can weight differently T's integration terms in space and therefore control smoothness differently around data and far from data.

As explained, the WCM criterion is not necessarily related to the way the smoothness equation is solved. As such, the WCM criterion may be implemented with one or more mesh based methods (such as Finite Element Method), one or more meshless methods, one or more mesh based methods with enrichment (Extended Finite Element Method) and/or one or more other methods (such as the Boundary Element Method). Where a smoothness approach is implemented, a WCM criterion can be implemented as well, which can help increase accuracy of thickness variation(s).

As an example, a WCM criterion can be implemented without adjustment to an underlying mesh definition, an underlying meshless definition, etc. However, a WCM criterion can be adjusted to account for one or more variations in such definitions. For example, where a mesh is refined in an area, weighting may be adjusted in a manner that can account for such mesh refinement. As an example, a WCM criterion approach may be implemented for homogenous spatial definitions of an underlying solution approach (e.g., mesh, meshless, etc.). As an example, a WCM criterion approach may be implemented for heterogeneous spatial definitions of an underlying solution approach (e.g., mesh, meshless, etc.).

Figure 11:
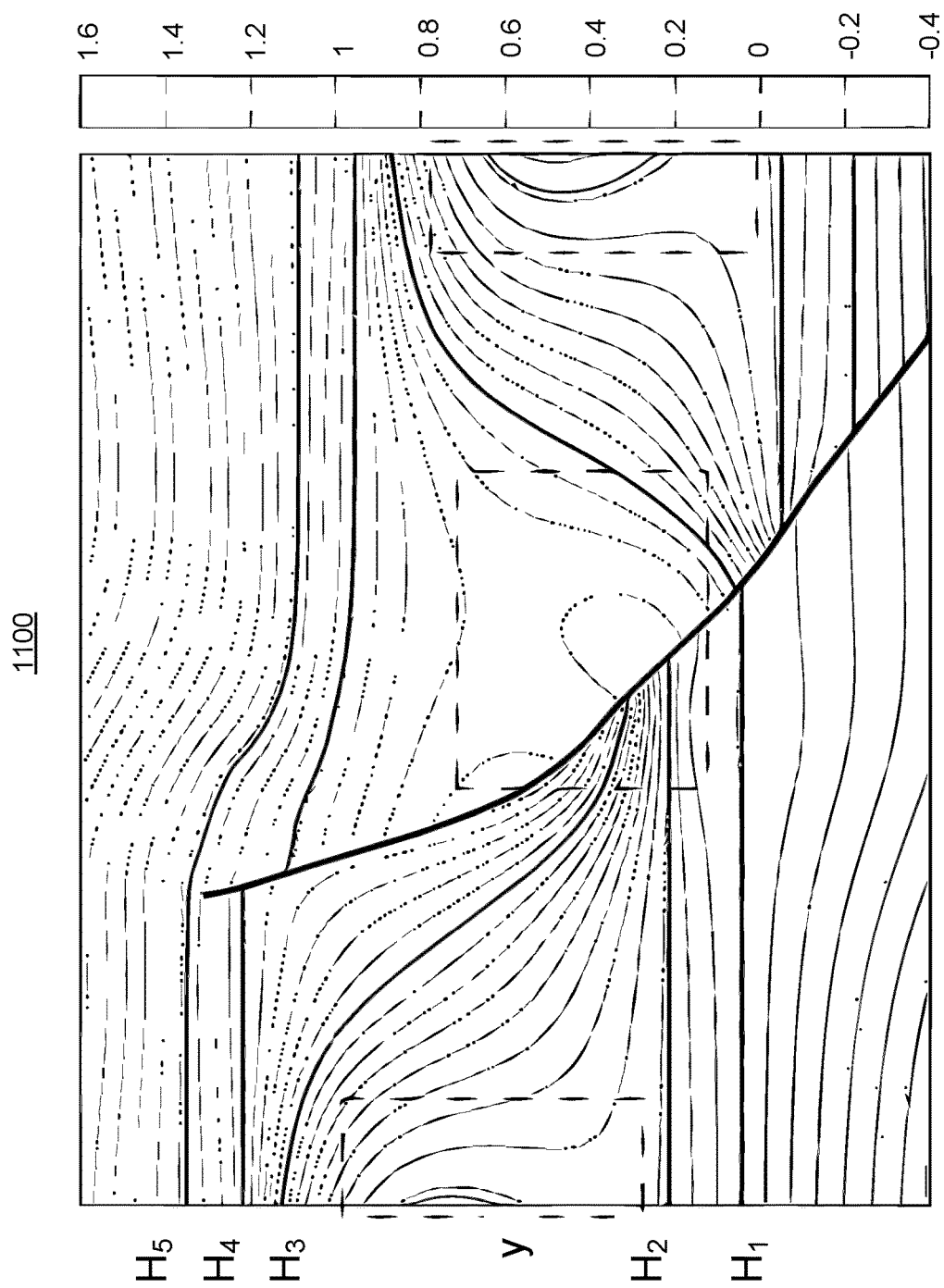
FIG. 11 illustrates an example of a model of a geologic region.
Figure 12:
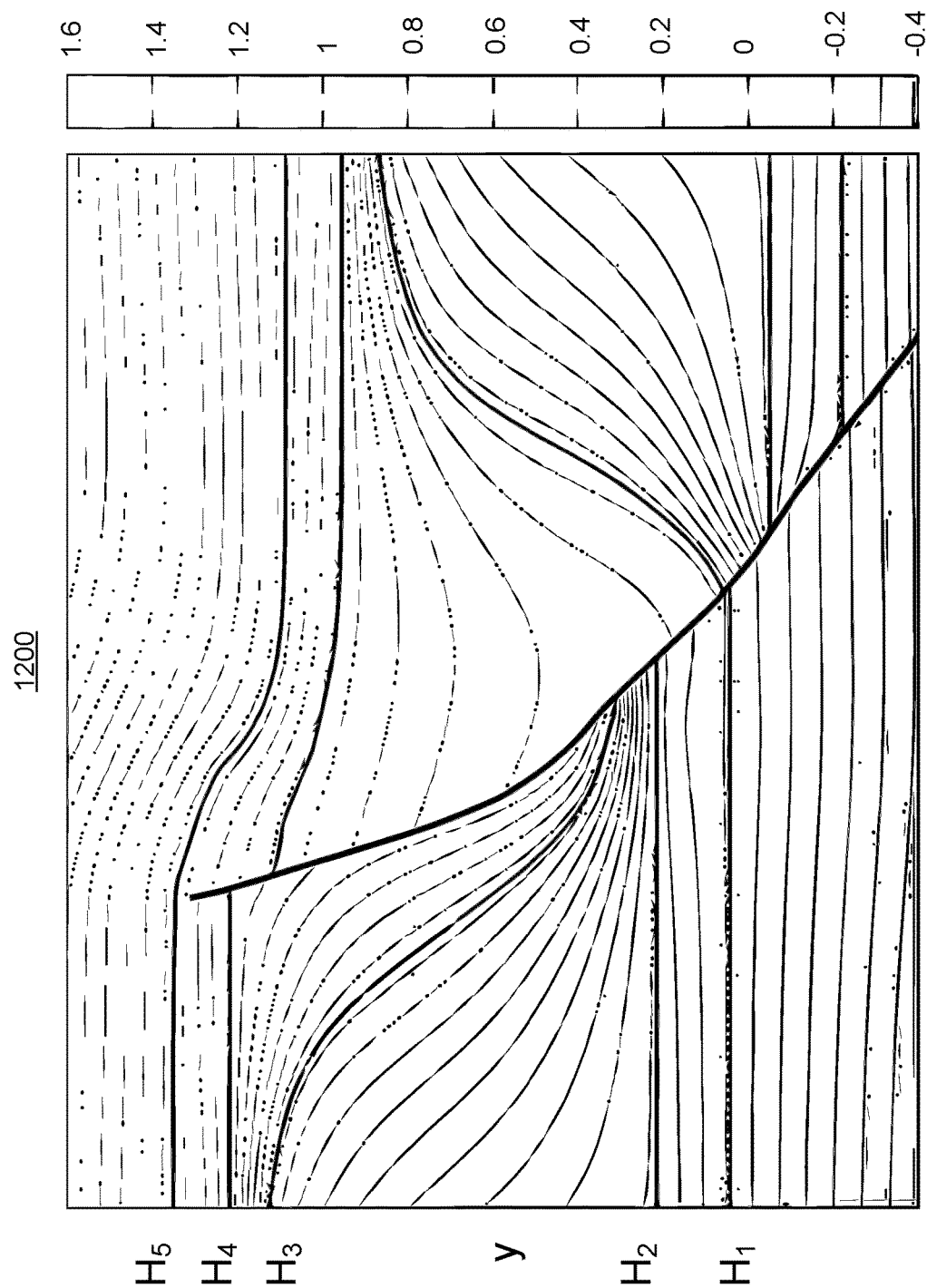
FIG. 12 illustrates an example of a model of a geologic region subject to a weighted curvature minimization criterion.

FIGS. 11 and 12 show the effects of the WCM criterion in a faulted example of a region for which implicit function values are calculated where data points are utilized. The example of FIGS. 11 and 12, as with the examples of FIGS. 7 to 10, are based on synthetic data for a region; noting that in a workflow, real data as acquired in the field can be utilized (see, e.g., the method 410 of FIG. 4).

FIG. 11 shows a plot 1100 of implicit function values for a region that are subjected to smoothness constraints without implementation of a WCM criterion. Without the WCM criterion, regardless the presence of the fault, the variation in thickness between layers creates holes and bumps in the implicit function. The sensitive areas where the implicit function is inconsistent with geological knowledge are pointed out with dashed rectangles in the plot 1100. Specifically, FIG. 11 shows an implicit function generated with a classical smoothness assumption on a faulted thickness variation problem. The presence of the fault makes no exception to the rule: as it was the case in the example of FIG. 7, closed curves of iso-values within the layers are created.

FIG. 12 shows a plot 1200 of implicit function values for the region considered in the plot 1100 where a WCM criterion is applied. In such an approach, the process defines an as linear as possible implicit function on each layer separately. The plot 1200 of FIG. 12 shows the implicit function generated with the WCM criterion added to the smoothness assumption on a faulted thickness variation problem as considered in the example of FIG. 11. As shown in the plot 1200, the WCM criterion approach did not result in the creation of closed curves, even with the presence of the fault. As such, the fault did not impact the results or implementation of the WCM criterion.

The WCM approach utilized to generate the implicit function of the plot 1200 of FIG. 12 can be understood by considering the minimization of curvature of the surface defined by the implicit function: the curvature is concentrated around data such that the gradient is varying strongly around data; while there is efficient minimization at beyond a particular distance from the data such that the gradient is as constant as possible far from the data. As to near and far, a neighborhood may be defined in one or more dimensions about a datum. Within that neighborhood, the WCM criterion approach can allow for a gradient that is greater than a gradient that is outside of the neighborhood. As an example, a radius may be utilized to define a circle, a sphere, etc., about a datum. As an example, one or more Cartesian coordinate values may be utilized to define a neighborhood about a datum (e.g., x, y, or z; x, y; y, z; x, z; x, y and z; etc.).

The results illustrated in the plot 1200 of FIG. 12 demonstrate that a WCM criterion approach can be implemented in scenarios where discontinuities exist, such as one or more faults, etc. As such a WCM criterion approach can be compatible with one or more types of geologic discontinuities (e.g., physical features in a region that may be evidenced by data such as seismic data and/or other data). As such, a WCM criterion approach is suitable for enhancing the accuracy of data-based structural modeling. Such an approach can be directly linked to data, which may be data that is acquired in raw and/or processed form. For example, consider raw seismic data as in a seismic image or picked data that is picked from a seismic image.

As an example, upon data selection for a method (see, e.g., the method 410 of FIG. 4), a WCM criterion approach may be applied where the data are assigned metadata as to one or more parameters associated with implementation of the WCM criterion approach. For example, consider generation of a neighborhood or neighborhoods based on proximity of one picked datum to another picked datum. In such an example, as a user continues to pick data, one or more WCM criterion parameters may be automatically adjusted such that, for example, neighborhoods do not overlap or overlap to an extent that is not to impact calculation of an implicit function and values thereof with respect to underlying real, physical geology of a region.

Figure 13:
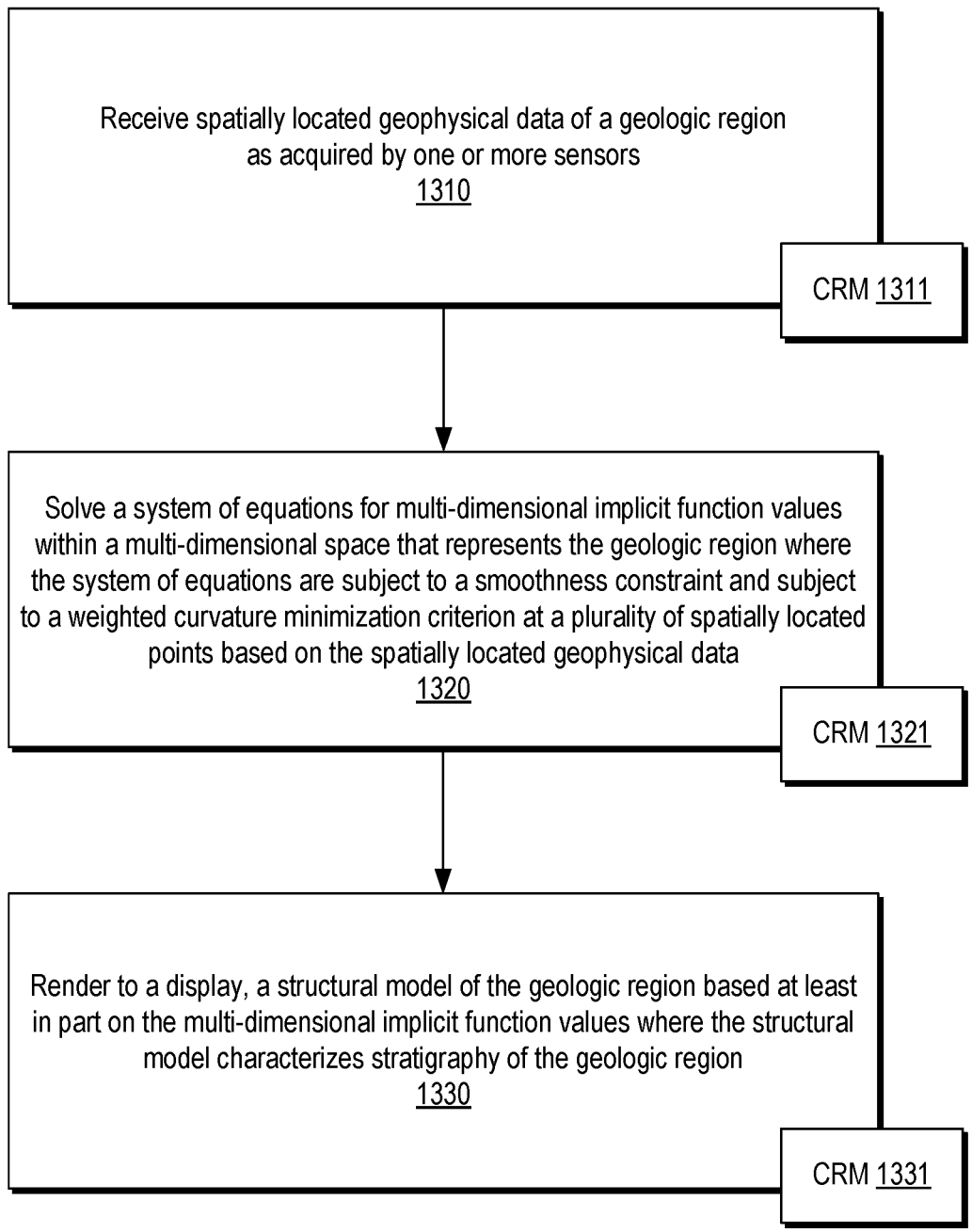
FIG. 13 illustrates an example of a method.

FIG. 13 shows an example of a method 1300 that includes a reception block 1310 for receiving spatially located geophysical data of a geologic region as acquired by one or more sensors; a solution block 1320 for solving a system of equations for multi-dimensional implicit function values within a multi-dimensional space that represents the geologic region where the system of equations are subject to a smoothness constraint and subject to a weighted curvature minimization criterion at a plurality of spatially located points based on the spatially located geophysical data; and a render block 1330 for rendering to a display, a structural model of the geologic region based at least in part on the multi-dimensional implicit function values where the structural model characterizes stratigraphy of the geologic region.

The method 1300 may be performed utilizing a tomographic analysis system that includes one or more processors. For example, such a system can include or otherwise be operatively coupled to one or more data sources for geophysical data. For example, seismic survey equipment can be operatively coupled to one or more networks and one or more data storage systems for transmission of field data to the one or more data storage systems. In such an example, geophysical data can be specified according to a survey, a field, etc., of a geologic region and received for processing by the tomographic analysis system. The tomographic analysis system can generate, via one or more tomographic techniques, an image of at least a portion of the geologic region, where the image is based at least in part on geophysical data. In such an example, the image can be a model, for example, as models exist for CCD arrays of cameras that allow for rendering an image to a display. In other words, for a digital camera, a viewer does not view photographic film (e.g., as in silver halide film of a slide or negative), rather the digital camera includes a processor that transforms signals received at a CCD array to digital information that is processed according to one or more models (e.g., spatial models, color models, etc.) to generate pixels values that can be rendered to a display (e.g., an LCD display of the digital camera). In such a manner, what a viewer sees through a lens-based direct view finder of the camera is reproduced as a digital model-based pixel image on the display where the pixel values may be stored in memory and later recalled.

As may be appreciated, a seismic survey can be expansive and cover tens or hundreds of square kilometers or more. A seismic survey system does not fit neatly into the hand of an individual; rather, it is distributed with various components that are operatively coupled by wired interfaces, wireless interfaces, etc. In a very general sense, the method 1300 of FIG. 13 can be akin to a process that improves the quality of a digital pixel image rendered by a digital camera or, for example, a medical image rendered to a display by a medical scanning system (e.g., an X-ray tomographic system, an MRI system, etc.); however, as may be appreciated, generating an accurate representation of a subsurface geologic region via acquisition and processing of geophysical data is more challenging technically than taking a "selfie" image with a digital camera.

The method 1300 is shown in FIG. 13 in association with various computer-readable storage medium (CRM) blocks 1311, 1321, and 1331. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1300. A computer-readable storage medium (CRM) is a physical device that can store information. As an example, the blocks 1311, 1321, and 1331 may be provided as instructions stored in a storage medium that is not a carrier wave, that is not a signal and that is non-transitory (see, e.g., the instructions 407 of the system 401 of FIG. 4).

As an example, the method 1300 of FIG. 13 may be implemented at least in part in a framework such as, for example, the PETREL® framework. As an example, a framework may be a structural modeling framework or a framework utilized in a structural modeling workflow. As an example, the method 1300 may be implemented in a workflow that includes utilizing the PETROMOD® framework. As an example, the method 1300 may be implemented in a workflow that includes utilizing the MANGROVE® framework. As an example, a structural model can be utilized for simulation. For example, consider a reservoir simulator that can utilize a model to perform simulations of physical phenomena. In such an example, a model may be based at least in part on a structural model and may be assigned properties that represent properties within a geologic region. Such properties may be spatially distributed based at least in part on iso-values of an implicit function, which may be subject to a WCM criterion.

Figure 14:
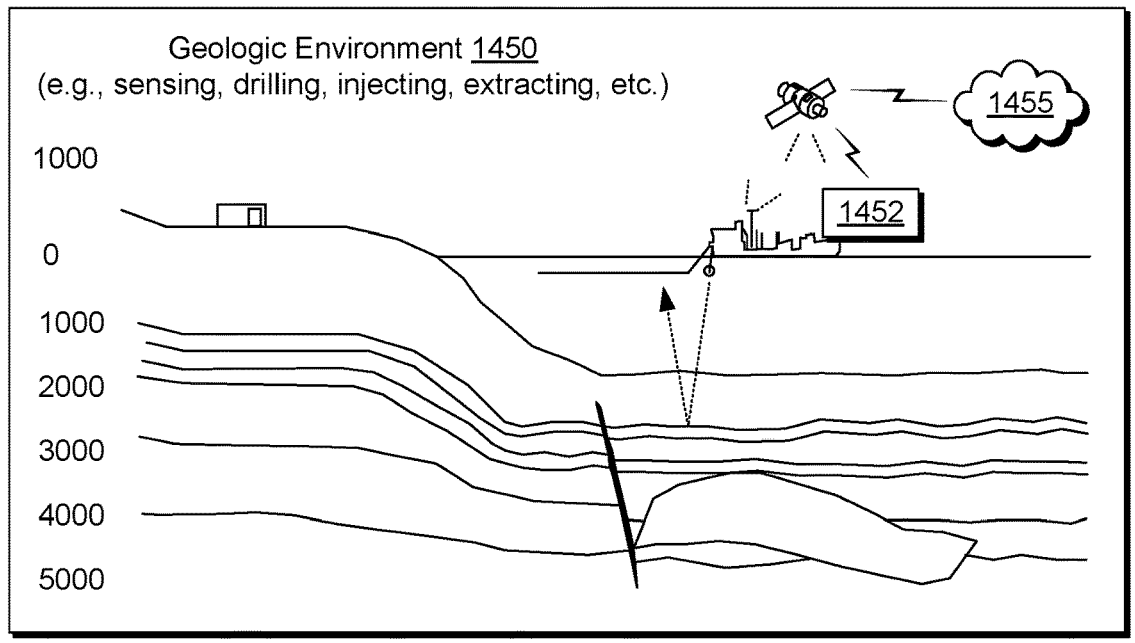
FIG. 14 illustrates an example of a system.
Figure 14:
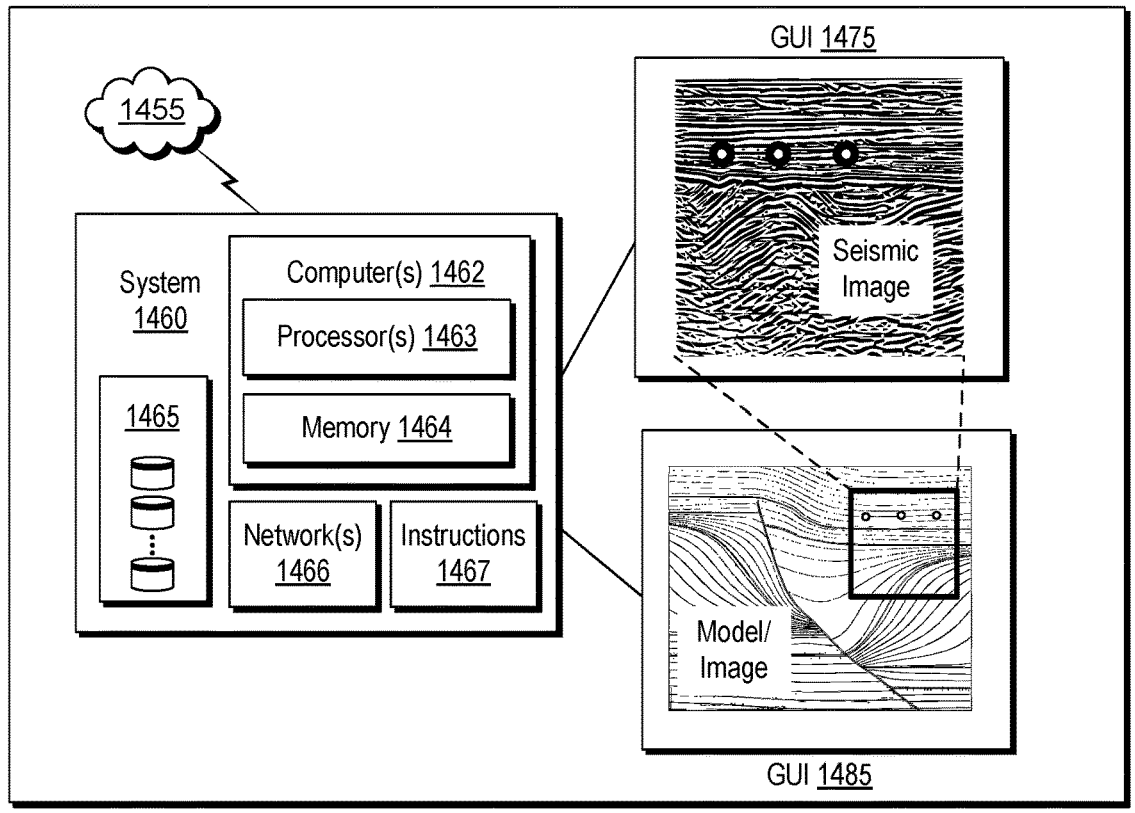

FIG. 14 shows an example of a seismic tomographic system 1400 with respect to a geologic environment 1450 that includes a geologic region with stratigraphic, structural layers. As shown, equipment 1452 can include a seismic energy source and seismic energy receivers that receive reflected seismic energy as emitted by the seismic energy source. An interface, as a reflector, can reflect a portion of the emitted seismic energy such that it can be received by one or more of the seismic energy receivers. Such received energy can be transformed to seismic data, for example, via use of one or more analog to digital converters (ADCs). Information may be transmitted, for example, via a network 1455 to a system 1460, which can include one or more computers 1462, one or more processors 1463, one or more memory devices 1464 (e.g., "memory"), one or more storage devices 1465, one or more network interfaces 1466 and one or more sets of instructions 1467, which can be stored in the memory devices 1464 and executable by one or more of the one or more processors 1463. As shown, a GUI 1475 and/or a GUI 1485 may be rendered to a display that is operatively coupled to or part of the system 1460.

The GUI 1485 shows a seismic image rendered to a display where points are picked or otherwise selected. Such geophysical data is thus spatially located and based at least in part on the seismic data as received via the portion of the system 1400 that is in the geologic environment 1450. Such points can be utilized in constructing a structural model of the seismically imaged region of the geologic environment 1450. For example, the method 1300 of FIG. 13 may be implemented by the system 1400 to generate a structural model and render the structural model to a display, as shown via the GUI 1485, which includes horizons identified by iso-values of a solved for implicit function. In the example of FIG. 14, the data points selected in the GUI 1475 are illustrated as spatially located data points in the GUI 1485, which can be shown in association with implicit function values that are calculated in a manner that is subject to a WCM criterion and one or more smoothness constraints.

FIG. 14 shows equipment and processes of an example of seismic tomography where reflection seismology is utilized to generate an image of a geologic region of the Earth. The method 1300 can be implemented to generate a more accurate image of the Earth, which can be a model or a model based image that is generated via geophysical data as acquired by one or more geophysical surveys of a geologic region of the Earth.

Figure 15:
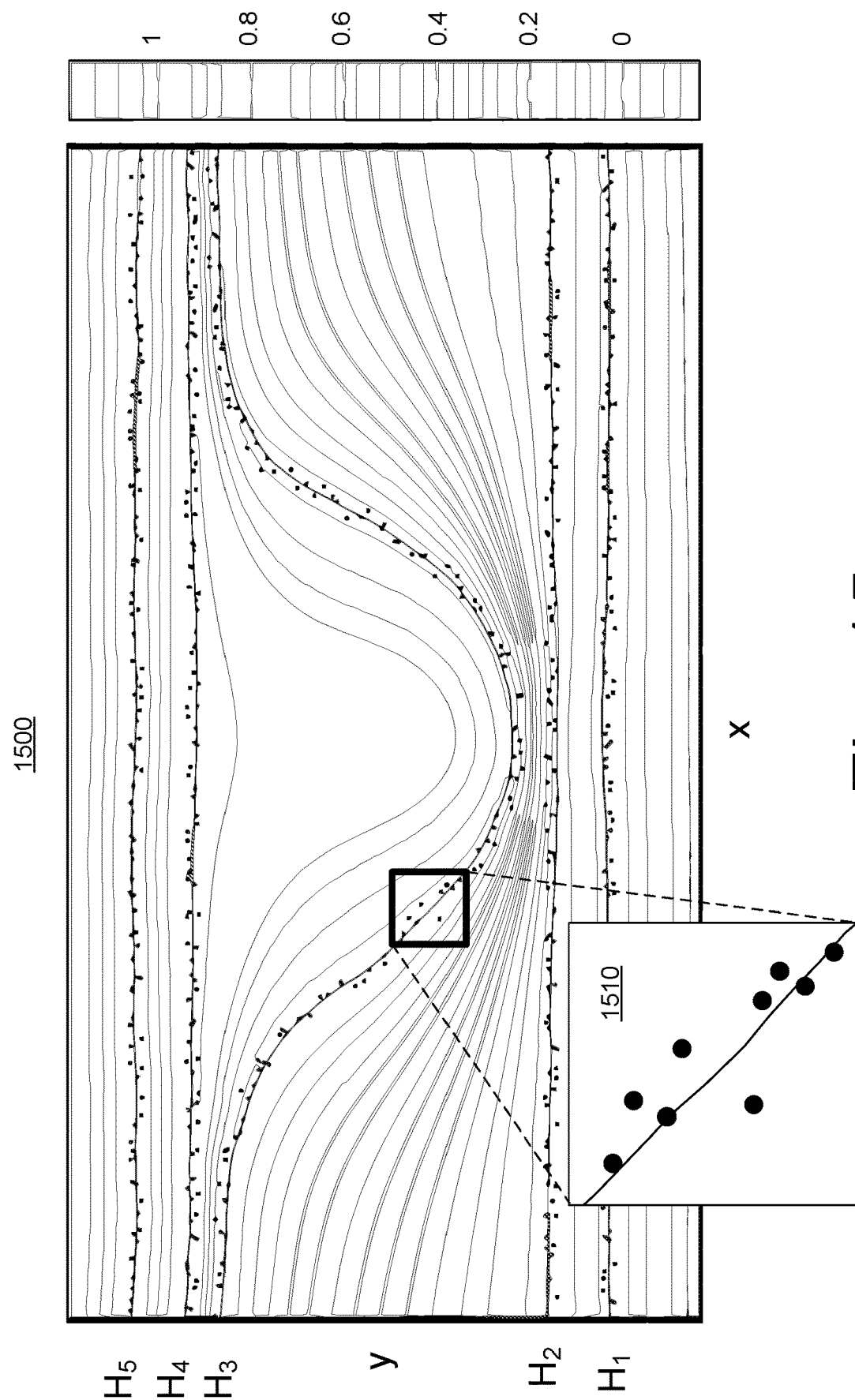
FIG. 15 illustrates an example of a model of a geologic region.

FIG. 15 shows an example of a plot 1500 of implicit function values in an x, y plane for a geologic region where horizons are identified as $H_1$, $H_2$, $H_3$, $H_4$ and $H_5$. As mentioned, implicit functions values can define a model. For example, the plot 1500 can be a plot that includes layers of a model of a geologic region, which may be a mesh based model, a meshless model, etc. Such a model can be utilized for one or more purposes, for example, to perform a workflow that includes simulating physical phenomena via a simulator (e.g., a reservoir simulator, etc.) to perform one or more field actions using model-based simulation results. For example, consider a drilling action that targets a particular layer of the Earth (e.g., a more accurate borehole trajectory for a well, etc.), which can be a reservoir layer. Or, for example, consider an injection action that injects fluid into a layer or layers of the Earth and/or a production action that produces fluid from a layer or layers of the Earth. In such examples, a more accurate model of a geological region can guide an action or actions spatially and/or functionally.

As shown, the implicit function values range from less than 0 to greater than 1. In the example of FIG. 15, the plot 1500 shows each of the horizons as corresponding to a particular implicit function value. Between the horizons, the implicit function values are shown without closed contours, which, as mentioned, can be inaccurate geologically.

In the example of FIG. 15, data points are shown with corresponding spatial locations (see, e.g., the GUI 1475 and the GUI 1485 of FIG. 14). Such data points can be from an interpretation process (see, e.g., the system 1400 of FIG. 14) such as picking where a seismic image is rendered to a display and a graphical user interface utilized to identify points that correspond to a feature or features of the seismic image (e.g., reflectors, etc.). In such an example, a computing system can store to memory data points with spatial locations, which may be accessed for purposes of generating implicit function values that can define a model.

In comparison to the plot 700 of FIG. 7, the data points of the plot 1500 include noise. As shown in the plot 1500, data points are noisy spatially in the x, y plane and the implicit function values for the horizons do not intersect each of the data points (e.g., the implicit function values for the horizons do not pass through each of the data points); yet, the implicit function values are without closed contours. Accordingly, the example of FIG. 15 demonstrates how a method such as the method 1300 of FIG. 13 can be robust to noise in that closed contours are not present even in the presence of noise, such as picking noise (e.g., due to inaccuracies generated by a human picker that picks data points in a seismic image).

In FIG. 15, an enlarged portion 1510 of the plot 1500 is shown to include data points that are spatially located where an implicit function value passes through at least one of the data points while various other data points are a distance from the implicit function value. As an example, a user may examine the data point locations and utilize such information as feedback as to accuracy of picking and/or quality of a seismic image utilized to pick the data points. Where one or more seismic attributes are utilized for generating one or more corresponding seismic images, feedback may be utilized to select and/or adjust a seismic attribute, which may provide a more accurate seismic image for purposes of picking. As an example, where the data points are extracted via an automated process, feedback may be provided to the automated process to adjust extraction such that less noise exists in spatial locations of extracted data points. In such an example, an automated reflector extraction process may be tuned and/or underlying seismic data processed to enhance accuracy.

As an example, one or more weights may be selected and/or adjusted based on deviations of spatial locations of data points from one or more implicit function values. For example, where a user desires an implicit function value to pass through more data point locations, one or more weights may be selected and/or adjusted to spatially constrain implicit function value(s) with respect to data point locations.

The method 1300 of FIG. 13 may be applied to one or more scales and may be adjusted spatially within a spatial domain to be solved for implicit function values of one or more implicit functions. As an example, data points may be available at different densities. For example, a density of data points for a horizon may be less than a density of data points for a smaller scale feature in a geologic environment (e.g., a geobody, etc.). As an example, a method can include assigning weights locally with respect to data points, which may help to reduce risk of generating implicit function values that do not have geologic meaning while still accurately representing various features, which may be at different scales.

In various scenarios, geological structures can be described from the millimetric to the kilometric scale. Such descriptions can help at understanding the local and regional geological contexts.

As explained, the method 1300 of FIG. 13 can be implemented in a manner that can handle a diversity of scales to generate accurate results (e.g., implicit function values) without inaccurate closed contours, which may demand additional processing in a model generation workflow.

As an example, a method can include refining weights in an iterative manner. For example, consider a method that calculates implicit function values and assesses the values to determine if one or more closed contours exist and, if so, adjusts one or more of the weights (e.g., weight refinement) and re-calculates implicit function values to reduce the presence of closed contour(s). Such an approach may operate locally, for example, in a manner that accounts for multi-scale features in a geologic region as evidenced in seismic data (e.g., via reflections of seismic energy, etc.).

As an example, a method can include selecting and/or adjusting a resolution of a discretization to account for local influences in space, for example, as to the local interpolation influence (e.g., as to interpolation functions constructing an implicit function) and/or the WCM influence in space (e.g., where the implicit function is to be more bent, etc.).

The method 1300 can be implemented with an aim to identify geological structures. Such a method may provide for normalization of sizes of folds and faults geometries in a model. For example, to identify a fold, metrics of a method (e.g., weights, etc.) can be adapted to its curvature and, for example, when dealing with discontinuities, metrics of a method (e.g., weights, etc.) can be adapted to the spacing between discontinuities.

As to some examples of WCM metrics in space, considerations for adaptation can include: resolution of the interpolation discretization (may it be mesh based or point based) to have at least one node adjacent to each data point concerned by WCM weighting; structure metrics (e.g., curvature of folds and faults); and average space between horizons in order to allow both the bending in space and a more rigid part between these bended parts.

As an example, if the 2D model used in FIG. 7 is of 200 meters laterally and 100 meters high (depthwise), with one fold defined on the entire model, utilizing 200 nodes by 100 nodes for discretizing the implicit function, then the spacing of the interpolation resolution can be of the order of approximately 1 meter in the directions of the x and y axes. Note that this discretization is considerably finer than what is demanded to seize the fold. As an example, similar results may be obtained with 20 nodes x 10 nodes (e.g., 10 meters spacing). With such a spacing (10 meters), and knowing that the distance between two horizons is approximately $\frac{1}{10}$ of the height of the model ($\frac{1}{10}*100=10$ meters), the chosen WCM influence metrics for the example of FIG. 9 are 4 meters in the directions of the x and y axes (e.g., centering on a data point, the nodes in this $4*4\ m^2$ window influence are governed by the WCM approach). In such an example, the approach allows to have, in the y axis, between two horizons (10 meters spacing), two bending areas of 2 meters and one rigid area of 6 meters.

Concerning the weights used to create FIG. 7 and FIG. 9, for FIG. 7, the weight on data constraints, and the global weight on the bending energy are set to 1; whereas, for FIG. 9, the same weight values were used for data constraints and global bending energy constraint (=1), and a weight of 0.06 was used for the WCM approach.

In the example of FIG. 15, with noise in the data (e.g., as may be due to poor picking on a poor quality seismic profile), the same metrics of interpolation influence and WCM influence were used as in the example of FIG. 9, and the weights were changed as follow: weight data=0.01, weight bending=4.5, and weight WCM=0.6. These were changed to "loosen" the implicit function and the horizon iso-values as to passing through each data point (e.g., including those influenced by noise) and to smooth the results, while still handling thickness variation of the seismic interpretation and model building.

The weights can represent a relative weight of pertinence that each constraint can have, for example, in a least squares sense of a system of equations to be solved for implicit function values. As an example, multiplying the three parameters while keeping the same relative proportion between them can result in the same implicit function.

As an example, a method can include receiving spatially located geophysical data of a geologic region as acquired by one or more sensors; solving a system of equations for multi-dimensional implicit function values within a multi-dimensional space that represents the geologic region where the system of equations are subject to a smoothness constraint and subject to a weighted curvature minimization criterion at a plurality of spatially located points based on the spatially located geophysical data; and rendering to a display, a structural model of the geologic region based at least in part on the multi-dimensional implicit function values where the structural model characterizes stratigraphy of the geologic region. In such an example, the smoothness constraint can be or include a gradient constraint that acts to spatially smooth the implicit function values. As an example, a method can include, within a neighborhood of each of a plurality of spatially located points, utilizing a weighted curvature minimization criterion that acts to curve the implicit function values (e.g., to allow for bending in an implicit function value in a spatial domain).

As an example, a geologic region can include at least one fault and a structural model may include at least one fault where the fault may separate horizons (e.g., be a discontinuity in space).

As an example, a structural model can include a plurality of horizons. In such an example, a layer can exist between two of the plurality of horizons. In such an example, the layer can have a thickness that varies spatially and that is defined by a vertical distance between the two of the plurality of horizons (see, e.g., the example of FIG. 15).

As an example, a structural model can include property values that correspond to geophysical properties of a geologic region.

As an example, geophysical data can be or include seismic data as may be acquired via a seismic survey that utilizes receivers that receive seismic energy waves and that convert received seismic energy waves to digital data (e.g., via an analog to digital converter, etc.).

As an example, a method can include receiving spatially located points that include picked points picked utilizing a graphical user interface rendered to a display and a seismic image rendered to the display where the seismic image is based at least in part on geophysical data.

As an example, a method can include simulating fluid flow in a geologic region via a computational simulator that utilizes a simulation model that is based at least in part on a structural model where accuracy of the structural model is enhanced via a WCM technique.

As an example, a method can include issuing at least one signal to a piece of equipment that instructs the equipment to perform an action in the geologic region. For example, the system 1400 of FIG. 14 includes one or more network interfaces 1466 that can be utilized to issue one or more signals to equipment in the geologic environment 1450 to perform one or more actions, which can be guided by an accurate structural model of at least a portion of the geologic environment 1450. In such an example, an action can be a drilling action that drills into a geologic region in a direction that is based at least in part on the structural model.

As an example, a system can include a processor; memory operatively coupled to the processor; processor-executable instructions stored in the memory to instruct the system to: receive spatially located geophysical data of a geologic region as acquired by one or more sensors; solve a system of equations for multi-dimensional implicit function values within a multi-dimensional space that represents the geologic region where the system of equations are subject to a smoothness constraint and subject to a weighted curvature minimization criterion at a plurality of spatially located points based on the spatially located geophysical data; and render to a display, a structural model of the geologic region based at least in part on the multi-dimensional implicit function values where the structural model characterizes stratigraphy of the geologic region.

As an example, one or more computer-readable storage media can include processor-executable instructions where the instructions include instructions to instruct a system to perform one or more methods, which can include one or more of the methods of FIG. 4, FIG. 5, FIG. 13, etc.

Figure 16:
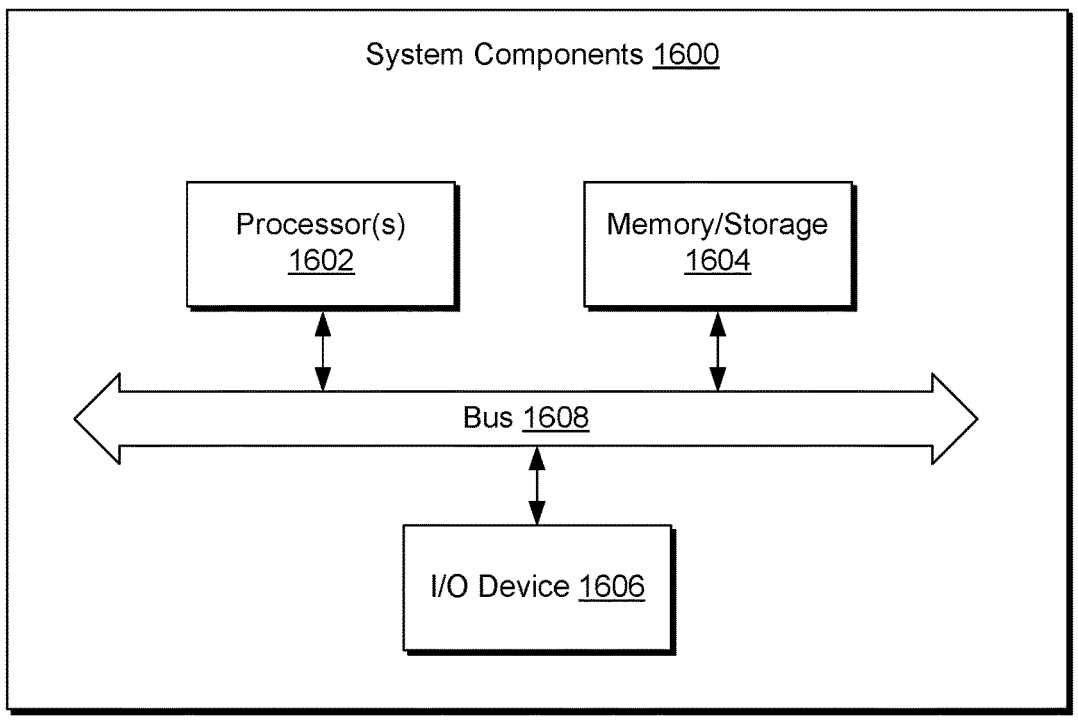
FIG. 16 illustrates example components of a system and a networked system.
Figure 16:
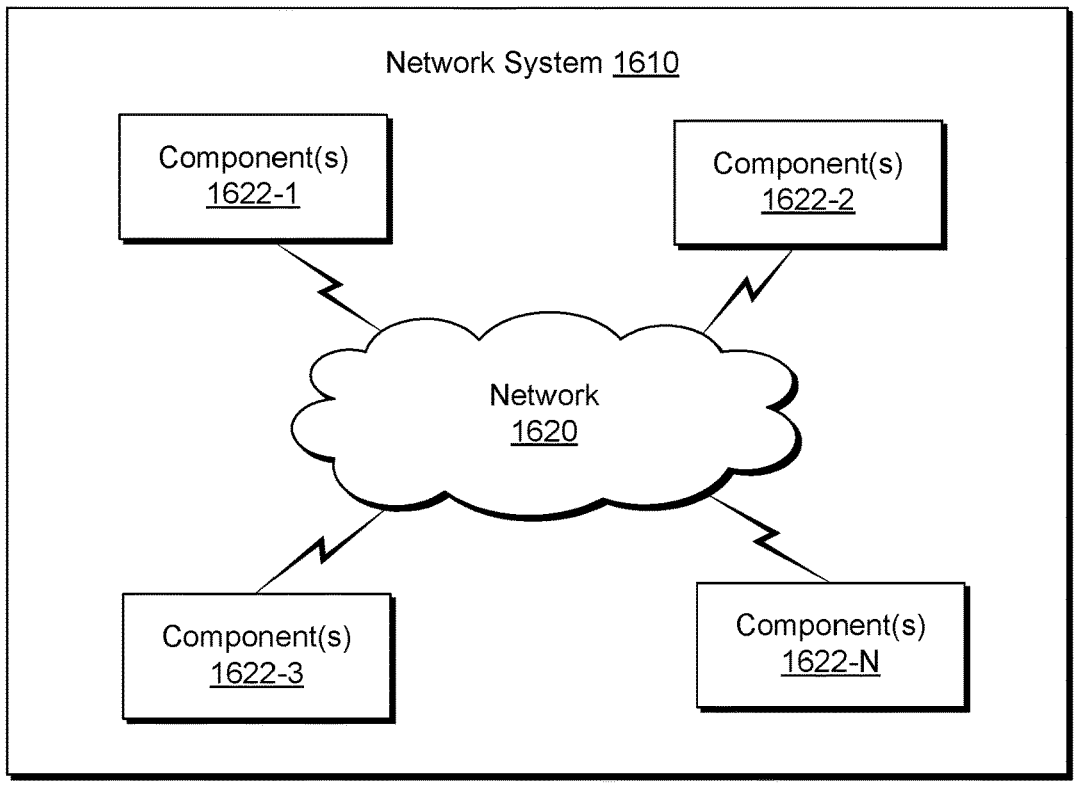

FIG. 16 shows components of an example of a computing system 1600 and an example of a networked system 1610. The system 1600 includes one or more processors 1602, memory and/or storage components 1604, one or more input and/or output devices 1606 and a bus 1608. In an example embodiment, instructions may be stored in one or more computer-readable media (e.g., memory/storage components 1604). Such instructions may be read by one or more processors (e.g., the processor(s) 1602) via a communication bus (e.g., the bus 1608), which may be wired or wireless. The one or more processors may execute such instructions to implement (wholly or in part) one or more attributes (e.g., as part of a method). A user may view output from and interact with a process via an I/O device (e.g., the device 1606). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1610. The network system 1610 includes components 1622-1, 1622-2, 1622-3, . . . 1622-N. For example, the components 1622-1 may include the processor(s) 1602 while the component(s) 1622-3 may include memory accessible by the processor(s) 1602. Further, the component(s) 1622-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
receiving spatially located geophysical data of a geologic region as acquired by one or more sensors, wherein the geophysical data comprise seismic data indicative of structural features of the geologic region;
defining a system of equations using a multi-dimensional implicit function within a multi-dimensional space that represents the geologic region, a smoothness constraint and a weighted curvature minimization (WCM) criterion at a plurality of spatially located points based on the spatially located geophysical data, wherein curvature minimization depends on WCM weighting;
solving the system of equations to output multi-dimensional implicit function values within the multi-dimensional space that represents the geologic region;
generating a structural model of the geologic region based at least in part on the multi-dimensional implicit function values, wherein at least some of the multi-dimensional implicit function values represent structural, stratigraphic layers of the geologic region; and
simulating fluid flow in the geologic region via a computational simulator that utilizes a simulation model that is based at least in part on the structural model.

2. The method of claim 1 wherein the smoothness constraint comprises a gradient constraint that acts to spatially smooth the implicit function values.

3. The method of claim 1 wherein, within a distance of each of the plurality of spatially located points, the weighted curvature minimization criterion acts to curve the implicit function values according to the WCM weighting.

4. The method of claim 1 wherein the geologic region comprises at least one fault.

5. The method of claim 1 wherein the structural model comprises a plurality of horizons.

6. The method of claim 5 wherein a layer exists between two of the plurality of horizons.

7. The method of claim 6 wherein the layer comprises a thickness that varies spatially and that is defined by a vertical distance between the two of the plurality of horizons.

8. The method of claim 1 wherein the structural model comprises property values that correspond to geophysical properties of the geologic region.

9. The method of claim 1 wherein the geophysical data comprise seismic data.

10. The method of claim 1 wherein the spatially located points comprise picked points picked utilizing a graphical user interface rendered to a display and a seismic image rendered to the display wherein the seismic image is based at least in part on the geophysical data.

11. The method of claim 1 comprising issuing at least one signal to a piece of equipment that instructs the equipment to perform an action in the geologic region.

12. The method of claim 11 wherein the action comprises a drilling action that drills into the geologic region in a direction that is based at least in part on the structural model.

13. A system comprising:
a processor;
memory operatively coupled to the processor;
processor-executable instructions stored in the memory to instruct the system to:
receive spatially located geophysical data of a geologic region as acquired by one or more sensors, wherein the geophysical data comprise seismic data indicative of structural features of the geologic region;
define a system of equations using a multi-dimensional implicit function within a multi-dimensional space that represents the geologic region, a smoothness constraint and a weighted curvature minimization (WCM) criterion at a plurality of spatially located points based on the spatially located geophysical data, wherein curvature minimization depends on WCM weighting;
solve the system of equations to output multi-dimensional implicit function values within the multi-dimensional space that represents the geologic region;
generate a structural model of the geologic region based at least in part on the multi-dimensional implicit function values, wherein at least some of the multi-dimensional implicit function values represent structural, stratigraphic layers of the geologic region; and
simulate fluid flow in the geologic region via a computational simulator that utilizes a simulation model that is based at least in part on the structural model.

14. The system of claim 13 wherein the smoothness constraint comprises a gradient constraint that acts to spatially smooth the implicit function values.

15. The system of claim 13 wherein, within a distance of each of the plurality of spatially located points, the weighted curvature minimization criterion acts to curve the implicit function values according to the WCM weighting.

16. The system of claim 13 wherein the geophysical data comprise seismic data.

17. One or more non-transitory computer-readable storage media comprising processor-executable instructions wherein the instructions comprise instructions to instruct a system to:
receive spatially located geophysical data of a geologic region as acquired by one or more sensors, wherein the geophysical data comprise seismic data indicative of structural features of the geologic region;
define a system of equations using a multi-dimensional implicit function within a multi-dimensional space that represents the geologic region, a smoothness constraint and a weighted curvature minimization (WCM) criterion at a plurality of spatially located points based on the spatially located geophysical data, wherein curvature minimization depends on WCM weighting;
solve the system of equations to output multi-dimensional implicit function values within the multi-dimensional space that represents the geologic region;
generate a structural model of the geologic region based at least in part on the multi-dimensional implicit function values, wherein at least some of the multi-dimensional implicit function values represent structural, stratigraphic layers of the geologic region; and
simulate fluid flow in the geologic region via a computational simulator that utilizes a simulation model that is based at least in part on the structural model.

18. The one or more non-transitory computer-readable storage media of claim 17 wherein the smoothness constraint comprises a gradient constraint that acts to spatially smooth the implicit function values.

19. The one or more non-transitory computer-readable storage media of claim 17 wherein, within a distance of each of the plurality of spatially located points, the weighted curvature minimization criterion acts to curve the implicit function values according to the WCM weighting.

* * * * *